United States Patent
Kawarai et al.

(10) Patent No.: US 6,687,225 B1
(45) Date of Patent: Feb. 3, 2004

(54) BANDWIDTH CONTROL APPARATUS

(75) Inventors: Kenichi Kawarai, Kawasaki (JP);
Hiroshi Tomonaga, Kawasaki (JP);
Naoki Matsuoka, Kawasaki (JP);
Naotoshi Watanabe, Kawasaki (JP);
Yasuhiro Ooba, Kawasaki (JP);
Hichiro Hayami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/421,465

(22) Filed: Oct. 19, 1999

(30) Foreign Application Priority Data

Nov. 10, 1998 (JP) .......................................... 10-318583

(51) Int. Cl.⁷ .......................... H04L 12/56; H04L 12/66
(52) U.S. Cl. ................. 370/230.1; 370/236.2; 370/395.4
(58) Field of Search .............................. 370/230, 230.1, 370/235, 236, 236.1, 236.2, 389, 395.1, 395.2, 395.21, 395.4, 395.41, 465, 469, 477

(56) References Cited

U.S. PATENT DOCUMENTS

| | | | | |
|---|---|---|---|---|
| 5,557,609 A | * | 9/1996 | Shobatake et al. | 370/60.1 |
| 5,570,361 A | | 10/1996 | Norizuki et al. | |
| 5,661,722 A | * | 8/1997 | Miyagi | 370/235 |
| 5,799,003 A | * | 8/1998 | Fujimaki et al. | 370/244 |
| 5,949,757 A | | 9/1999 | Katoh et al. | |
| 6,023,467 A | * | 2/2000 | Abdelhamid et al. | 370/395 |
| 6,134,249 A | * | 10/2000 | Nakao | 370/528 |
| 6,181,675 B1 | * | 1/2001 | Miyamoto | 370/218 |
| 6,212,186 B1 | * | 4/2001 | Tada et al. | 370/395 |

FOREIGN PATENT DOCUMENTS

| | | |
|---|---|---|
| EP | 0 866 631 | 9/1998 |
| JP | 3-71749 | 3/1991 |
| JP | 4-310033 | 11/1992 |
| JP | 5-276187 | 10/1993 |
| JP | 06046085 | 2/1994 |
| JP | 08079265 | 3/1996 |
| JP | 9-149046 | 9/1999 |

OTHER PUBLICATIONS

Vojnovic, et al.: "Analytical and Simulation Analysis of the Explicit–Rate ABR Flow Control Algorithms: Transient Behavior" Computer and Communications, 1998. XP010295232: pp. 271–275 ISBN: 0–8186–8538–7.

Cell Bandwidth Control Apparatus U.S. patent appln. No. 08/979,431, Filed Nov. 26, 1997.

* cited by examiner

*Primary Examiner*—Alpus H. Hsu
(74) *Attorney, Agent, or Firm*—Katten Muchin Zavis Rosenman

(57) ABSTRACT

The invention relates to a bandwidth control apparatus in ATM equipment, for inserting management cells such as OAM cells, the control apparatus being configured to secure a bandwidth for the insertion of a management cell such as an OAM cell when the need arises, while guaranteeing the service quality of user cells, thereby making effective use of network resources for a best effort service such as ABR or UBR. The bandwidth control apparatus comprises a cell insertion block 1-10 for inserting a management cell such as an OAM cell and a shaping block 1-20 for performing user cell shaping, wherein the cell insertion block 1-10 issues an empty cell request when a cell insertion request occurs, the shaping block 1-20, upon receiving the empty cell insertion request, inserts an empty cell in a user cell stream being output from a shaping buffer 1-22, and the cell insertion block 1-10 writes a management cell such as an OAM cell over the empty cell inserted on a cell highway 1-30, thus sending the management cell out on the cell highway 1-30.

27 Claims, 27 Drawing Sheets

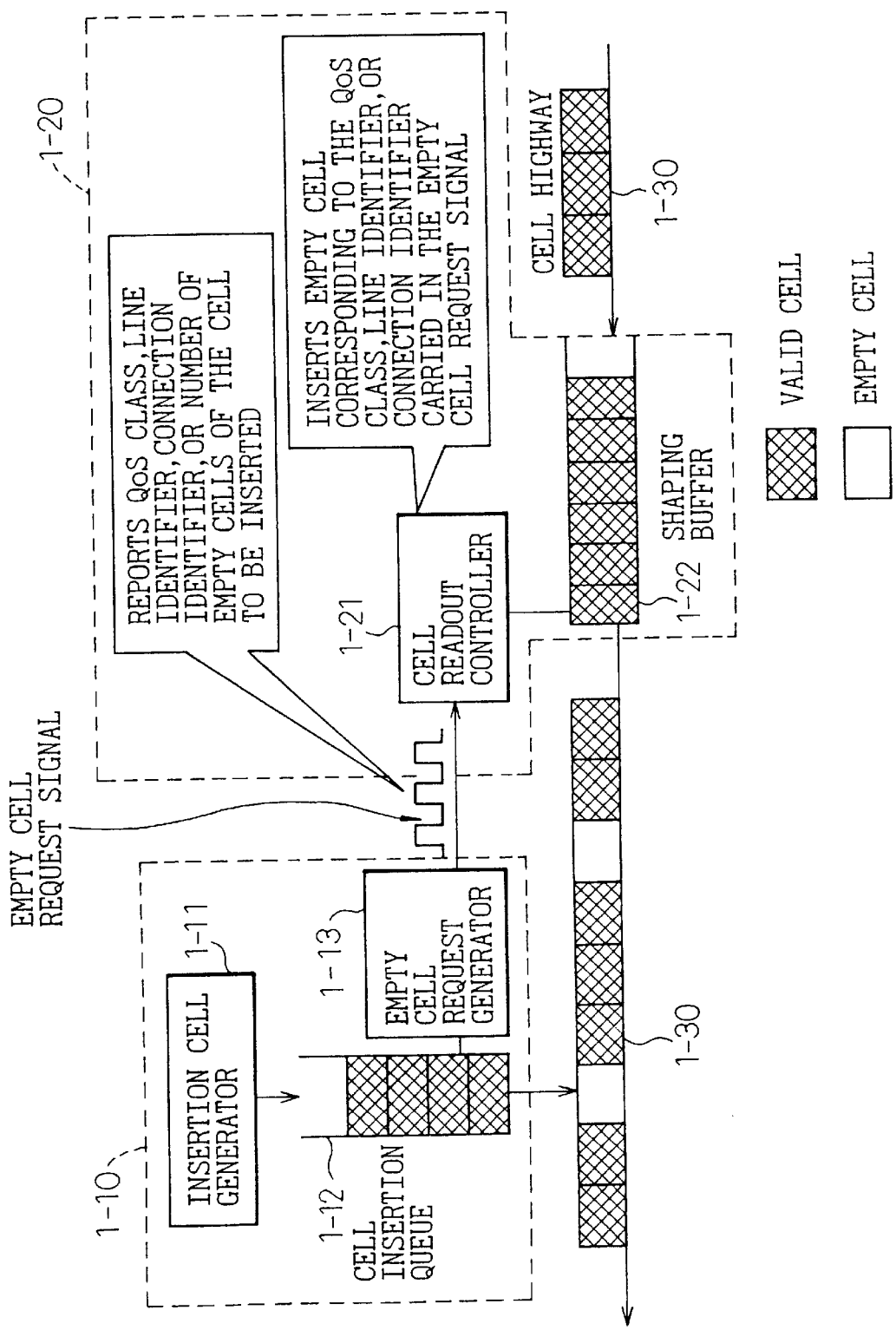

USER CELL FORMAT

OAM CELL FORMAT

EMPTY CELL FORMAT

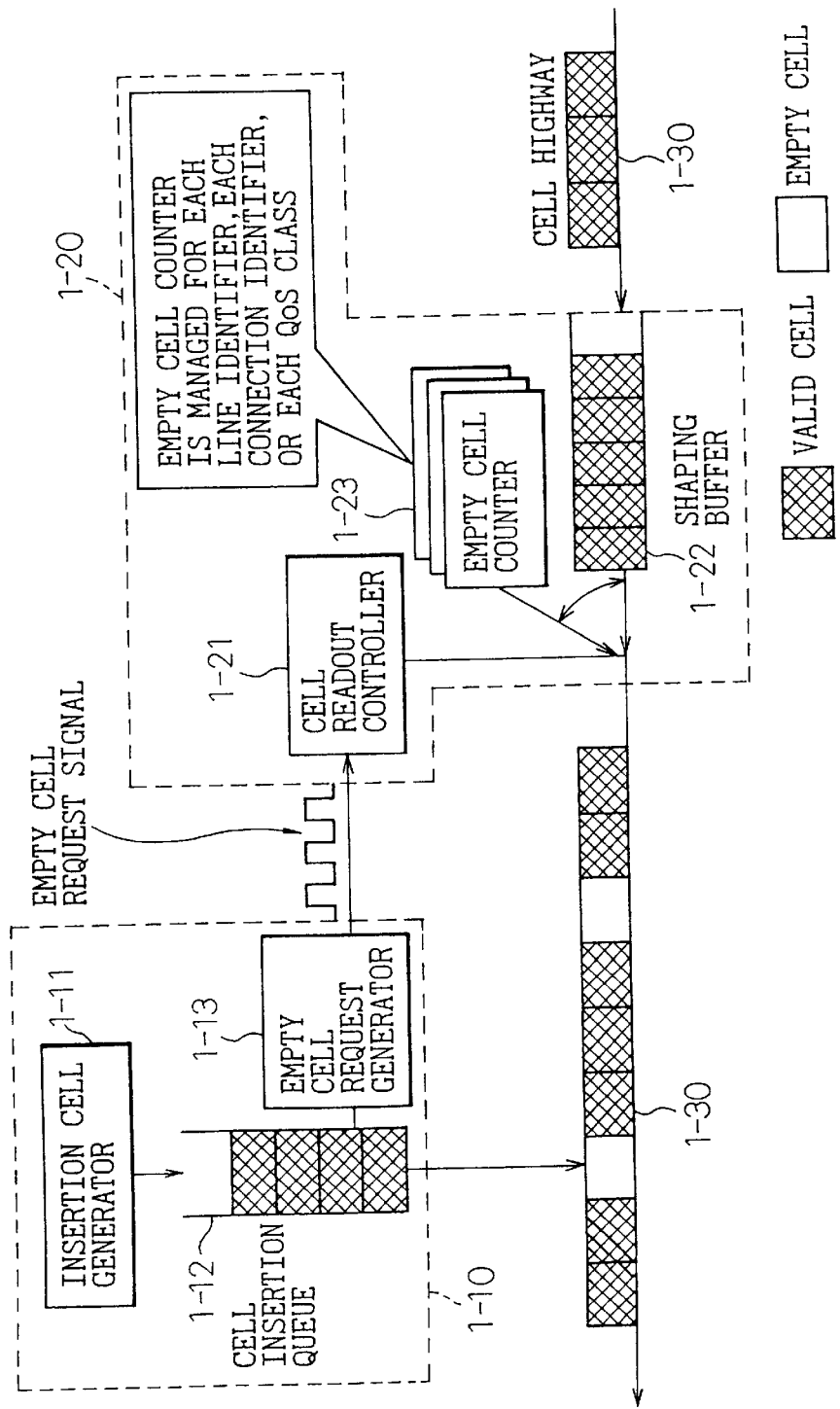

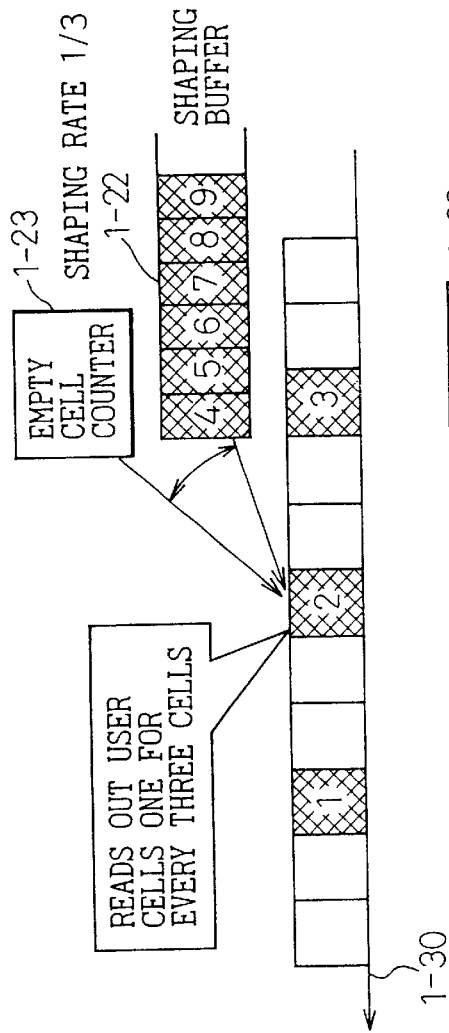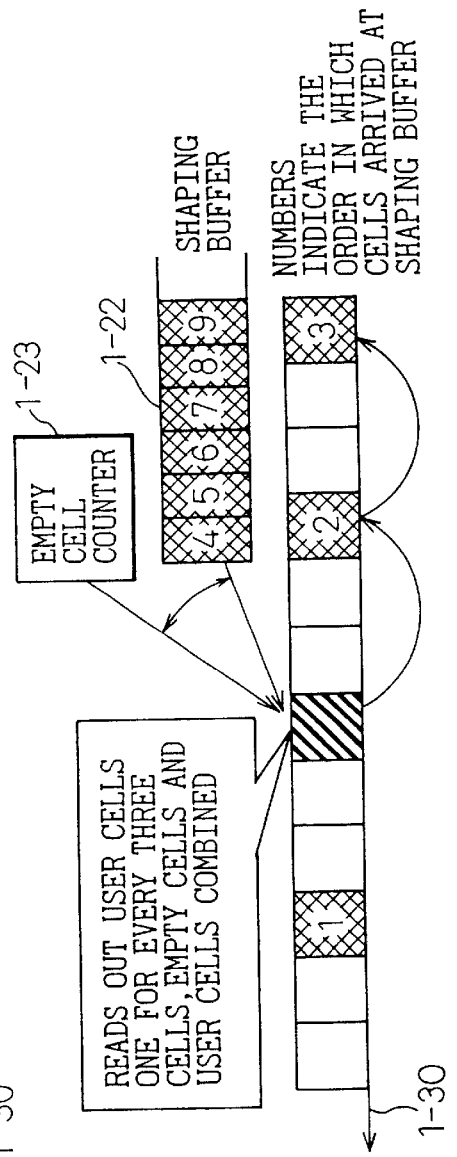

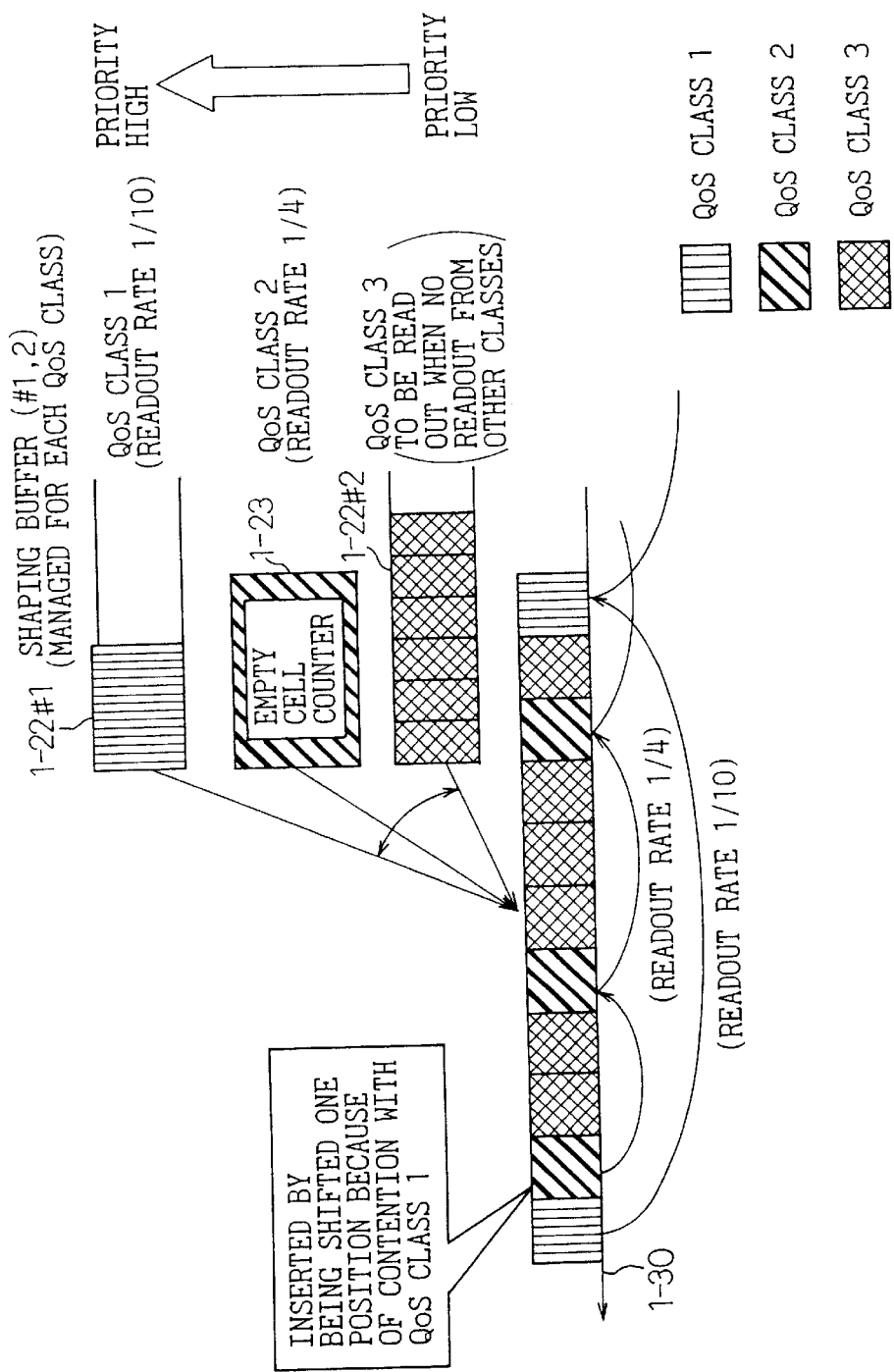

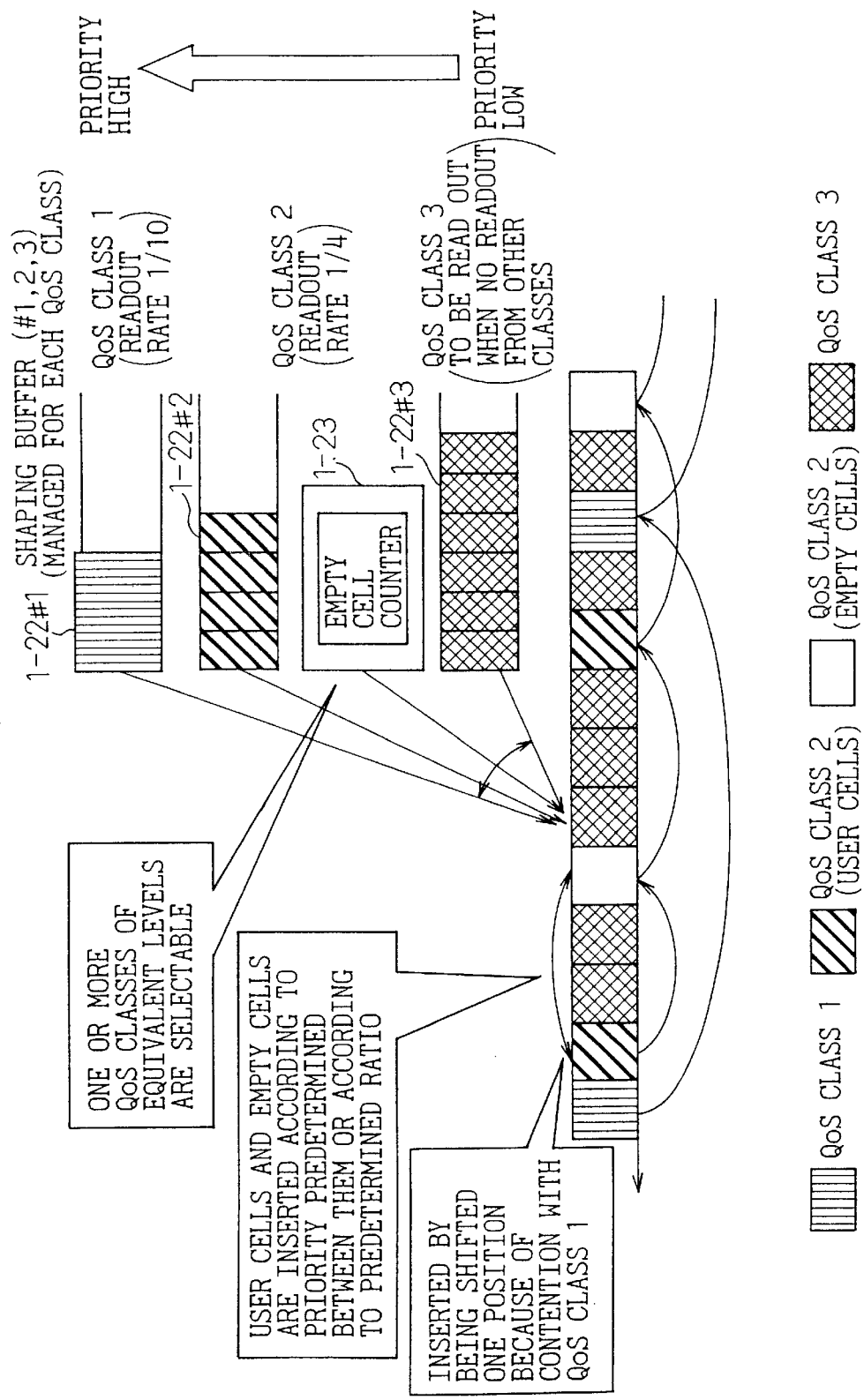

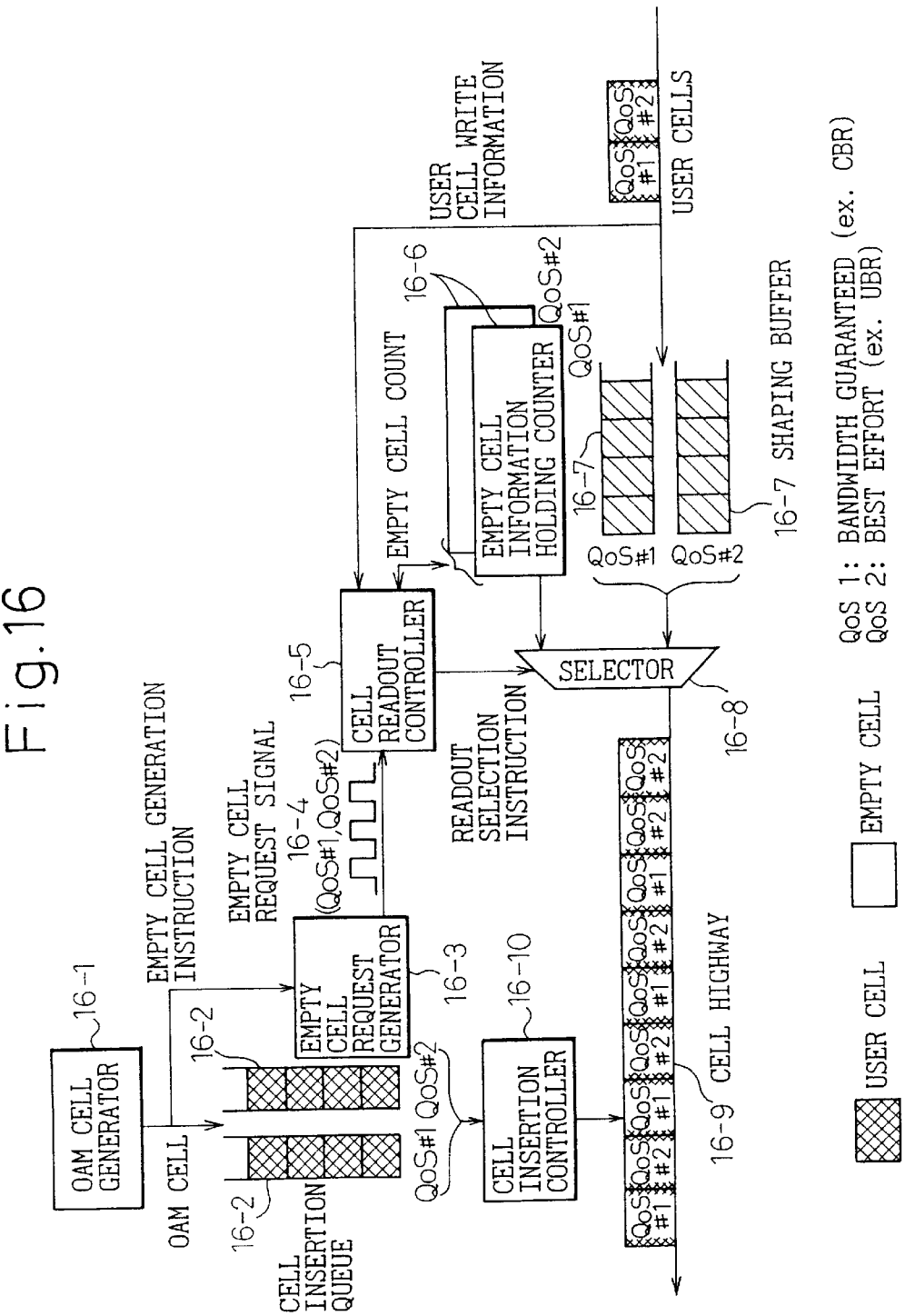

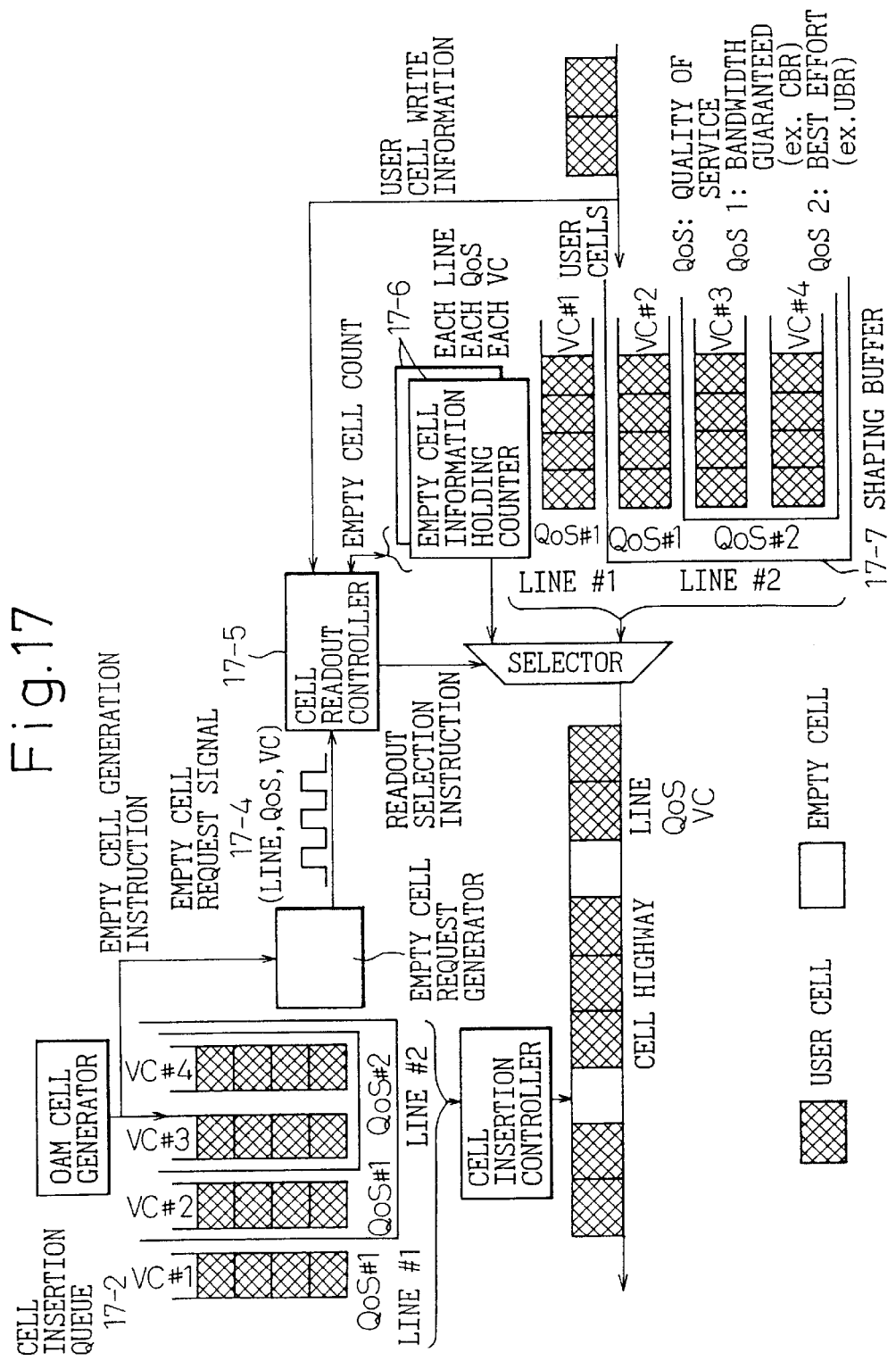

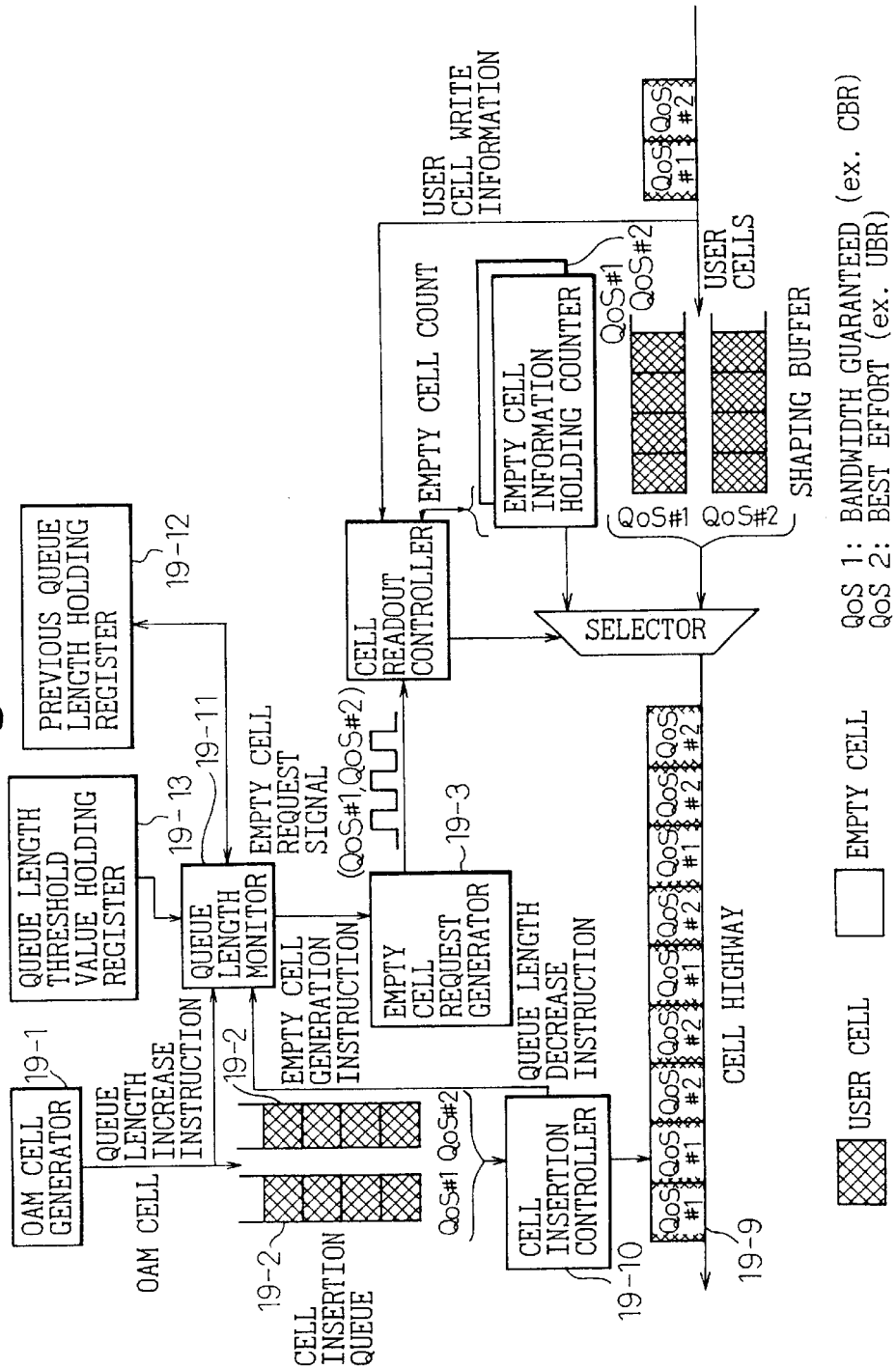

BANDWIDTH CONTROL APPARATUS

BACKGROUND OF THE INVENTION

1. Field of the Invention

In recent years, in additional to quality guaranteed services, exemplified by Constant Bit Rate (CBR) and Variable Bit Rate (VBR) services that provide quality guarantees for cell discard rates, delay characteristics, etc. by specifying user cell transfer rates such as peak cell rate and sustainable cell rate (average cell rate), the provision of best effort services, exemplified by Available Bit Rate (ABR) and Unspecified Bit Rate (UBR) services in which quality guarantee is held to a minimum but, instead, user traffic is accommodated as long as bandwidth is available within the network, have been proposed aiming at providing a low-cost service.

The present invention relates to a bandwidth control apparatus, for inserting management cells such as OAM (Operation and Maintenance) cells, in ATM equipment such as an ATM exchange and other ATM communication equipment or a packet communication equipment that provide the quality guaranteed and the best effort services described above.

2. Description of the Related Art

FIG. 27 is a diagram for explaining a prior art bandwidth control apparatus in ATM equipment. In the figure, reference numeral 27-10 is a cell insertion block, 27-11 is an insertion cell generator, 27-12 is a cell insertion queue, 27-20 is a shaping block having an empty cell insertion function, 27-21 is a cell readout controller, 27-22 is a shaping buffer, and 27-30 is a cell highway.

The shaping buffer 27-22 accumulates user cells received from the cell highway 27-30, and the cell readout controller 27-21 performs shaping by controlling cell readout so that the user cells are read out of the shaping buffer 27-22 so as not to exceed a predetermined bandwidth, that is, at a rate averaged so that the transmission rate of the user cells at any instant does not exceed a predetermined value.

Further, the cell readout controller 27-21 controls the cell readout from the shaping buffer 27-22 so that empty cells for insertion of management cells such as OAM cells are inserted between user cells at a pre-estimated fixed rate.

A management cell such as an OAM cell is generated by the insertion cell generator 27-11 and stored in the cell insertion queue 27-12, and when an empty cell arrives on the cell highway 27-30, the management cell is read out of the cell insertion queue 27-12 and written over the empty cell for transmission on the cell highway 27-30.

In this way, in the prior art, the cell readout controller 27-21 has reserved in advance a bandwidth for the insertion of management cells such as OAM cells separately from a bandwidth for user service in order to allow the insertion of management cells such as OAM cells while guaranteeing required bandwidth for user cells. Accordingly, the bandwidth for the insertion of management cells such as OAM cells has/had to be secured at all times regardless of whether there arises the need to insert a management cell such as an OAM cell.

Japanese Unexamined Patent Publication No. 3-71749 (Japanese Patent Application No. 1-208237) discloses an ATM cell insertion method that inserts a cell on the highway when cell insertion becomes necessary, but this method has been intended to insert a cell within a prescribed time after the occurrence of a cell which needs to be inserted, regardless of the quality of service provided to the user.

In the configuration in which the bandwidth for the insertion of management cells such as OAM cells is reserved on a permanent basis, as in the prior art example shown in FIG. 27, the bandwidth for the largest management cell or OAM cell expected to be inserted must be reserved fixedly, and empty cells are inserted at a predetermined rate even at times when there is no need to insert management cells such as OAM cells; this has lead to the problem that the bandwidth indicated by oblique hatching in FIG. 27, where no management cells such as OAM cells are inserted, is not utilized effectively thus wasting the bandwidth.

On the other hand, in the configuration in which management cells such as OAM cells are inserted by the ATM cell insertion method described in the above-cited Patent Publication, when a management cell such as an OAM cell to be inserted occurs, the management cell or OAM cell is inserted by stopping the transmission of user cells regardless of the quality of service for the user cells; this can cause user cell delay or discarding, resulting in the problem of being unable to guarantee the required quality of service for the user cells.

SUMMARY OF THE INVENTION

An object of the preset invention is to make effective use of network resources by not reserving in advance the bandwidth for the insertion of management cells such as OAM cells but securing the OAM cell or management cell insertion bandwidth only when the need arises, while guaranteeing the required quality of service for user cells, and by allocating that bandwidth for the transmission of cells of best effort service such as ABR or UBR when no OAM cells or like management cells are being inserted.

(1) A bandwidth control apparatus in ATM equipment, according to the present invention, comprises: a buffer for accumulating received user cells; readout control means for reading out the user cells within a predetermined bandwidth from the buffer; and means for controlling the readout control means in response to a management cell transmission request so that the user cells are read out of the buffer in such a manner as to allow a management cell to be inserted.

(2) A bandwidth control apparatus in ATM equipment, according to the present invention, comprises a cell insertion block for inserting a management cell and a shaping block for shaping a user cell, wherein: the cell insertion block includes means for sending an empty cell insertion request to the shaping block; when a cell insertion request occurs, and means for writing an insertion cell into an empty cell inserted on a cell highway, and the shaping block includes means for generating the empty cell when the empty cell insertion request is received from the cell insertion block, and for inserting the empty cell on the cell highway, and wherein: only when a management cell insertion request occurs, the management cell is inserted by allocating a bandwidth thereto.

(3) When sending the empty cell insertion request, the cell insertion block reports the quality of service class of the insertion cell, and the shaping block inserts the empty cell based on the reported quality of service class.

(4) When sending the empty cell insertion request, the cell insertion block reports the line identifier of the insertion cell, and the shaping block inserts the empty cell based on the reported line identifier.

(5) When sending the empty cell insertion request, the cell insertion block reports the connection identifier of the insertion cell, and the shaping block inserts the empty cell based on the reported connection identifier.

(6) When sending the empty cell insertion request, the cell insertion block transmits information containing all of the quality of service class, line identifier, and connection identifier of the insertion cell, or a combination of two of them, and the shaping block inserts the empty cell based on the transmitted information of the insertion cell.

(7) When sending a request for the insertion of a plurality of empty cells, the cell insertion block transmits the same empty cell insertion request information repeatedly a plurality of times.

(8) When sending a request for the insertion of a plurality of empty cells, the cell insertion block reports the number of repetitions of the same cell insertion request information.

(9) The cell insertion block includes a cell insertion queue, and sends the empty cell insertion request to the shaping block when writing the insertion cell to the cell insertion queue.

(10) The cell insertion block includes means for monitoring the queue length of the cell insertion queue, and sends the empty cell insertion request to the shaping block when the queue length has exceeded a predetermined threshold value.

(11) The shaping block includes an empty cell counter or empty cell request queue for holding the number of empty cell requests received from the cell insertion block, the empty cell counter being configured to manage the insertion of empty cells separately from a shaping buffer.

(12) The shaping block includes means for writing the empty cell at the head or the tail of a user cell queue in a shaping buffer when the empty cell insertion request is received from the cell insertion block, the shaping block being configured to centrally manage insertion empty cells and user cells by using the shaping buffer.

(13) The shaping block is provided with the empty cell counter for each line identified.

(14) The shaping block is provided with the empty cell counter for each connection identifier.

(15) The shaping block is provided with the empty cell counter for each quality of service class.

(16) The shaping block is provided with the empty cell counter for each of the line identifier, the connection identifier, and the quality of service class or for each combination of two of them.

(17) The shaping block includes means for performing bandwidth control by assuming that a user cell has been read out of the shaping buffer when inserting the empty cell, the shaping block being configured to perform shaping by including an empty cell bandwidth within a user cell bandwidth.

(18) The shaping block includes means for performing control so as not to read out a user cell from the shaping buffer when inserting the empty cell but to read out the user cell after the insertion of the empty cell, the shaping block being configured to perform shaping for an empty cell bandwidth and a user cell bandwidth separately from each other.

(19) The shaping block assigns one quality of service class to requested empty cells, and inserts the empty cells on the cell highway at a predetermined rate.

(20) The shaping block assigns one quality of service class to requested empty cells, and reads out the empty cells onto the cell highway when user cells of another higher priority quality of service classes are not being read out.

(21) Between the empty cells and user cells assigned a quality of service class that allows the user cells to be read out when cells of other higher priority quality of service classes are not being read out, the shaping block reads out the user cells or the empty cells in accordance with priority predetermined between the user cells and the empty cells.

(22) The shaping block assigns as the quality of service class of requested empty cells the same quality of service class as one of the quality of service classes assigned to user cells, and reads out the empty cells onto the cell highway.

(23) The shaping block reads out user cells or empty cells in accordance with priority predetermined between the user cells and the empty cells.

(24) The shaping block reads out empty cells and user cells alternately at a predetermined ratio onto the cell highway.

(25) The shaping block assigns to the requested empty cells one or more quality of service classes selected from among a plurality of quality of service classes.

BRIEF DESCRIPTION OF THE DRAWINGS

The present invention will be more clearly understood from the description as set forth below with reference to the accompanying drawings.

FIG. 2 is a diagram for explaining empty cell insertion that matches a bandwidth request for a management cell according to the present invention.

FIG. 10 is a diagram for explaining how the empty cell counter performs the empty cell insertion in response to the bandwidth request for the insertion of a management cell according to the present invention.

FIGS. 11A and 11B are diagrams for explaining empty cell insertion responding to a request for the aggregate bandwidth of management cells and user cells according to the present invention.

FIG. 13 is a diagram for explaining empty cell insertion performed by the empty cell counter when QoS class is assigned according to the present invention.

FIG. 15 is a diagram for explaining empty cell insertion when the empty cell counter of the present invention is assigned the same QoS class as that of other user cells.

FIG. 16 is a diagram showing a first embodiment of the present invention.

FIG. 17 is a diagram showing a second embodiment of the present invention.

FIG. 19 is a diagram showing a third embodiment of the present invention.

DESCRIPTION OF THE PREFERRED EMBODIMENTS

Figure 1:
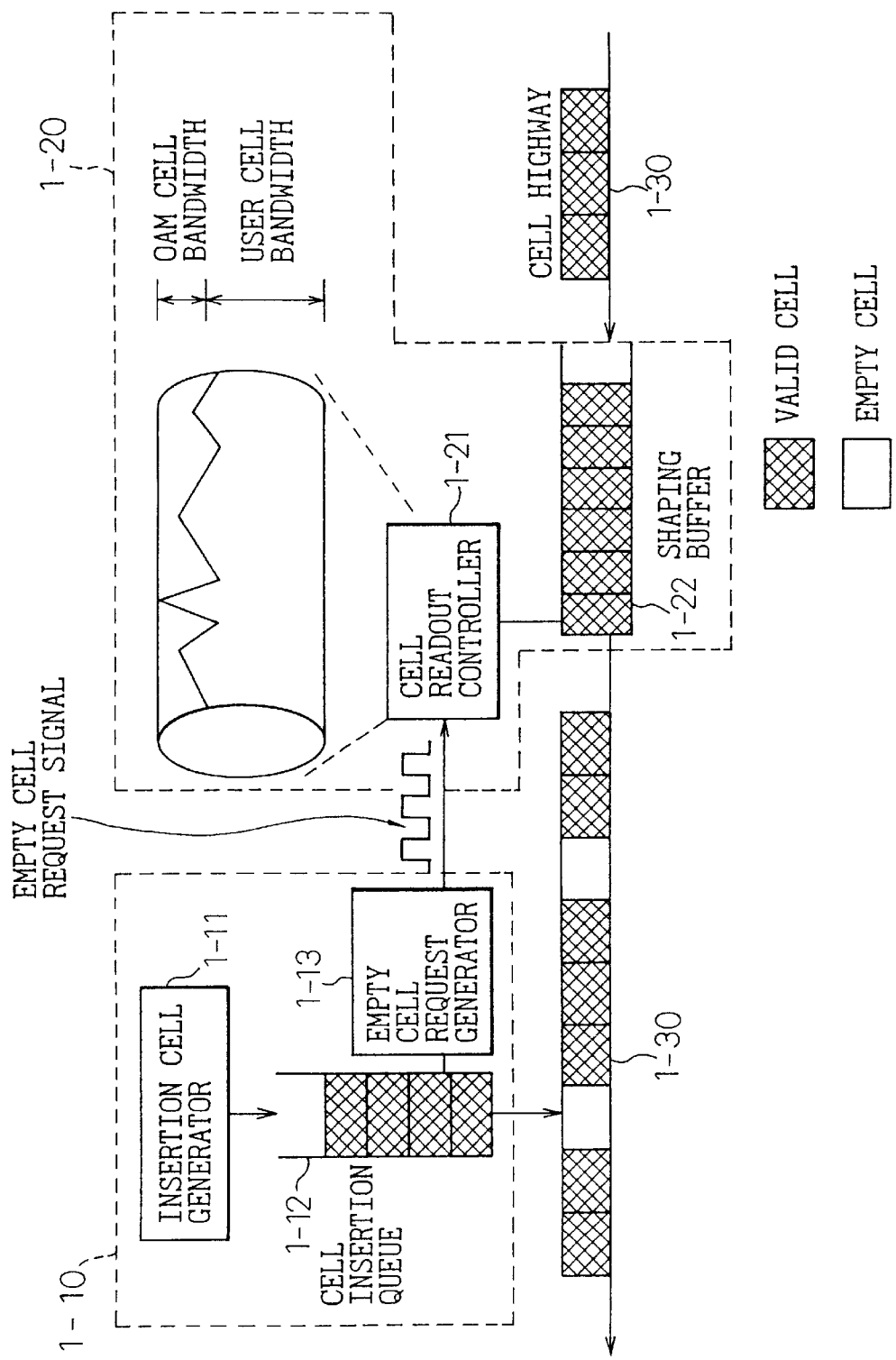
FIG. 1 is a diagram for explaining a bandwidth for the insertion of management cells such as OAM cells according to the present invention.

FIG. 1 is a diagram for explaining a bandwidth for the insertion of management cells such as OAM cells according to the present invention. In the figure, reference numeral 1-10 is a cell insertion block, 1-11 is an insertion cell generator, 1-12 is a cell insertion queue, 1-13 is an empty cell request generator, 1-20 is a shaping block having an empty cell insertion function, 1-21 is a cell readout controller, 1-22 is a shaping buffer, and 1-30 is a cell highway.

The shaping buffer 1-22 accumulates user cells received from the cell highway 1-30, and the cell readout controller 1-21 performs shaping by controlling cell readout so that the user cells are read from the shaping buffer 1-22 so as not to exceed a predetermined bandwidth, that is, at a rate averaged!so that the transmission rate of the user cells at any instant does not exceed a predetermined value.

When a request for the insertion of a management cell such as an OAM cell occurs, the insertion cell generator 1-11 generates the management cell to be inserted and stores it in the cell insertion queue 1-12. When the management cell is stored in the cell insertion queue 1-12, the empty cell request generator 1-13 sends an empty cell request signal to the cell readout controller 1-21 in the shaping block 1-20. In response to the empty cell request, the cell readout controller 1-21 instructs the shaping buffer 1-21 to insert an empty cell for the insertion of the management cell.

In this way, the shaping buffer 1-22 inserts an empty cell as necessary on an on-demand basis, and sends it out onto the cell highway 1-30. When the empty cell inserted by the shaping block 1-20 arrives, the cell to be inserted is read out of the cell insertion queue 1-12 in the cell insertion block 1-10, and written over the empty cell for transmission on the cell highway 1-30.

Since the cell readout controller 1-21 secures the insertion bandwidth only when the management cell insertion request occurs, when no management cells are being inserted the entire bandwidth can be allocated for the transmission of cells of the best effort service class such as ABR or UBR, and the entire bandwidth can thus be utilized effectively.

FIG. 2 is a diagram for explaining empty cell insertion that matches the bandwidth request for a management cell such as an OAM cell. When a request for the insertion of a management cell such as an OAM cell occurs, the empty cell request generator 1-13 in the cell insertion block 1-10 issues an empty cell request to the cell readout controller 1-21 in the shaping block 1-20 by sending an empty cell request signal carrying the Quality of Service (QoS) class, line identifier, or connection identifier of the cell to be inserted, or all of them or a combination of any two of them and, in response, the cell readout controller 1-21 inserts an empty cell that matches the empty cell request signal.

In this way, the cell insertion block 1-10 reports the QoS class, line identifier, or connection identifier of the management cell such as an OAM cell to be inserted, as the empty cell request information, in response to which the shaping block 1-20 can insert an empty cell that matches the empty cell request and can thus secure a bandwidth matching the requested OAM cell insertion. Here, the line identifier is the identification number of a physical line, while the connection identifier is the identification number of a virtual line.

Figure 3A:
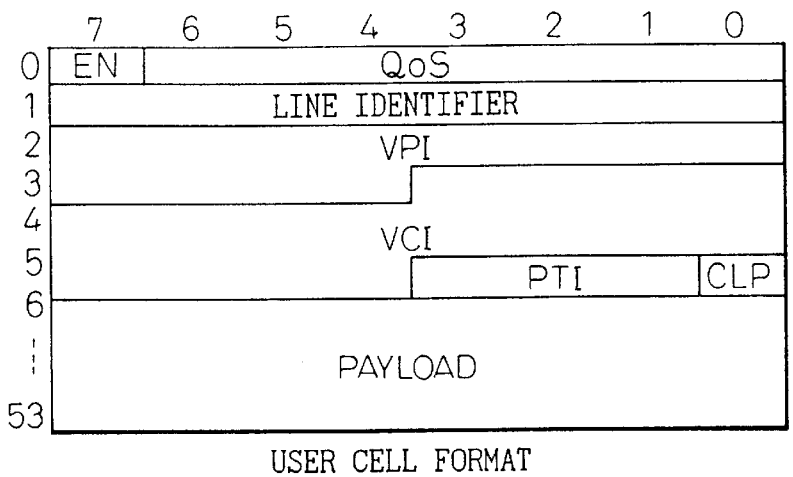
FIGS. 3A to 3C are diagrams showing cell formats used in the present invention.
Figure 3B:
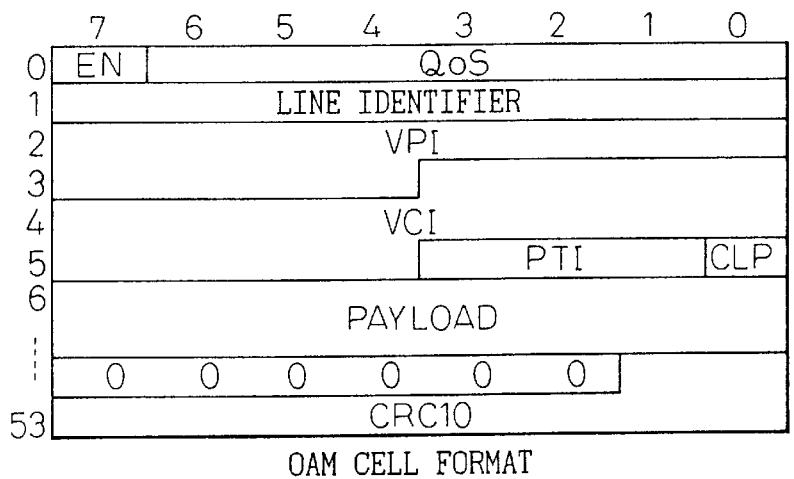
Figure 3C:
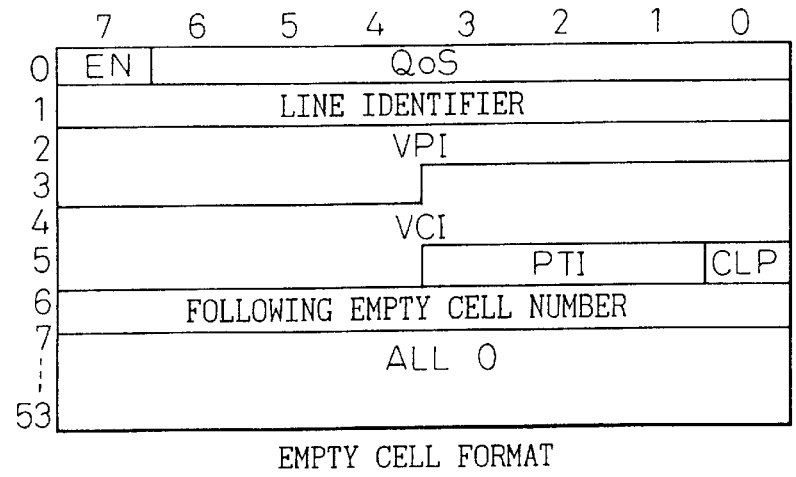

FIGS. 3A to 3C show cell formats used in the present invention. Three kinds of cell formats are used, that is, the user cell format shown in FIG. 3A, the OAM cell format shown in FIG. 3B, and the empty cell format shown in FIG. 3C.

The user cell format is the format of a cell for transmitting user data, the OAM cell format is the format of an OAM cell for transmitting OAM information such as failure information, connection continuity test information, or connection quality information, and the empty cell format is the format of an empty cell transmitted to explicitly indicate the absence of a cell when there is no valid cell to be transmitted.

In the cell formats shown in FIGS. 3A to 3C, "EN" is an empty cell identifier (EN=0: empty cell, EN=1: valid cell), "QoS" is a Quality of Service class identifier, "VP1" is a virtual path identifier, "VC1" is a virtual channel identifier, "PT1" is a payload type identifier, "CLP" is a cell loss priority indicator, and "CRC10" is a cyclic redundancy code, "FOLLOWING EMPTY CELL NUMBER" is the number of following consecutive empty cells.

In the cell formats shown in FIGS. 3A to 3C, the header portion is somewhat different from the header portion of the standardized ATM cell format, but within a closed system such as an ATM exchange, the header portion can be changed as appropriate, as shown in the formats illustrated here.

Further, since the QoS class, connection identifier, line identifier or following empty cell number is appended to the empty cell, a cell having the corresponding QoS class, connection identifier, line identifier or the number of consecution can be read out of the cell insertion queue 1-12 in the cell insertion block 1-10 and inserted to overwrite the empty cell.

The QoS class, line identifier, or connection identifier, or the number of requests transmitted as the empty cell request information previously shown in FIG. 2 can be recognized by extracting the QOS in the 0th byte, the line identifier in the first byte, or the VPI and VCI in the second to fifth bytes, or the following empty cell number in the sixth byte, respectively, in each cell format.

Figure 4:
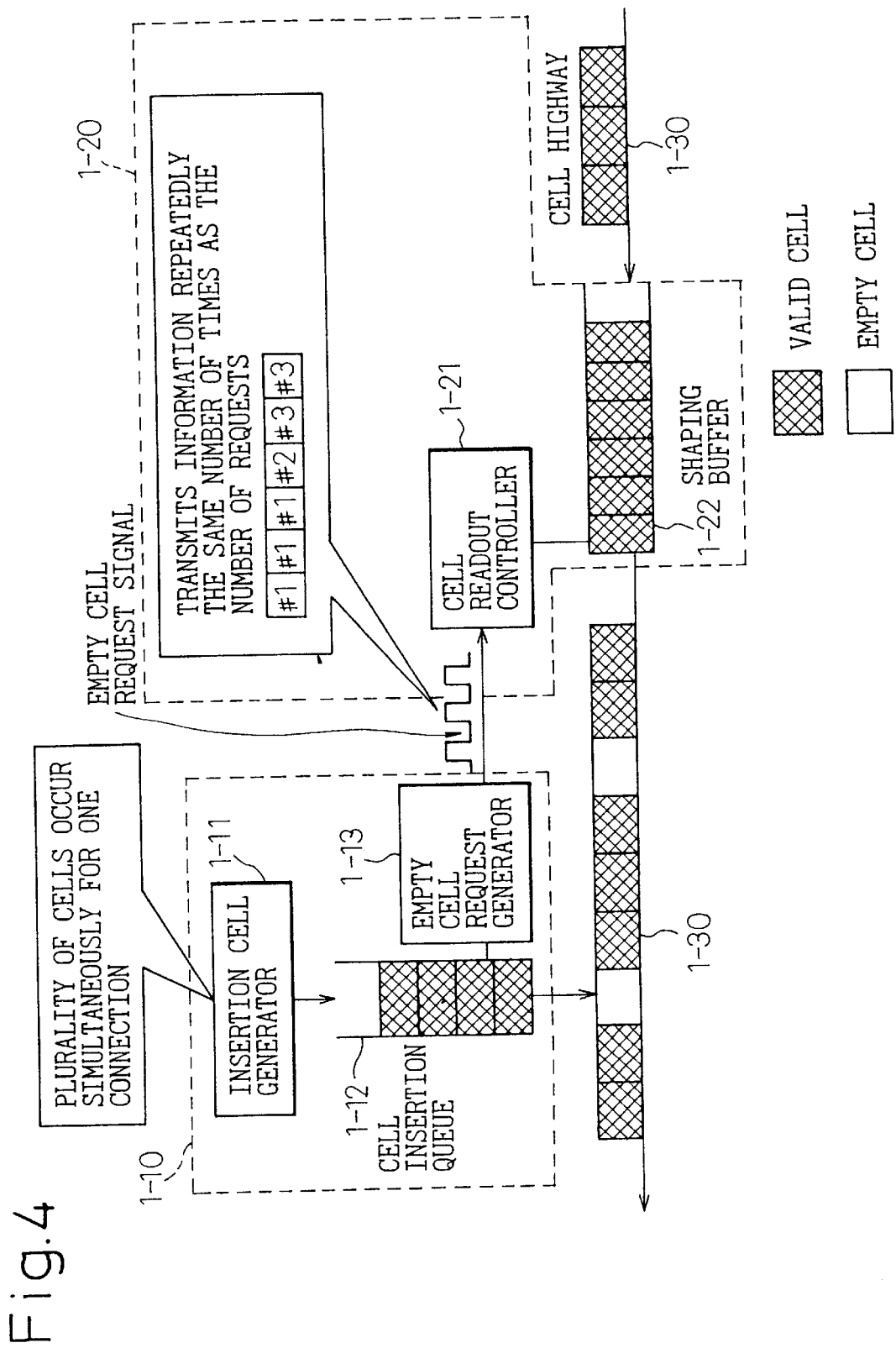
FIG. 4 is a diagram for explaining empty cell insertion when inserting a plurality of management cells on one connection according to the present invention.
Figure 5:
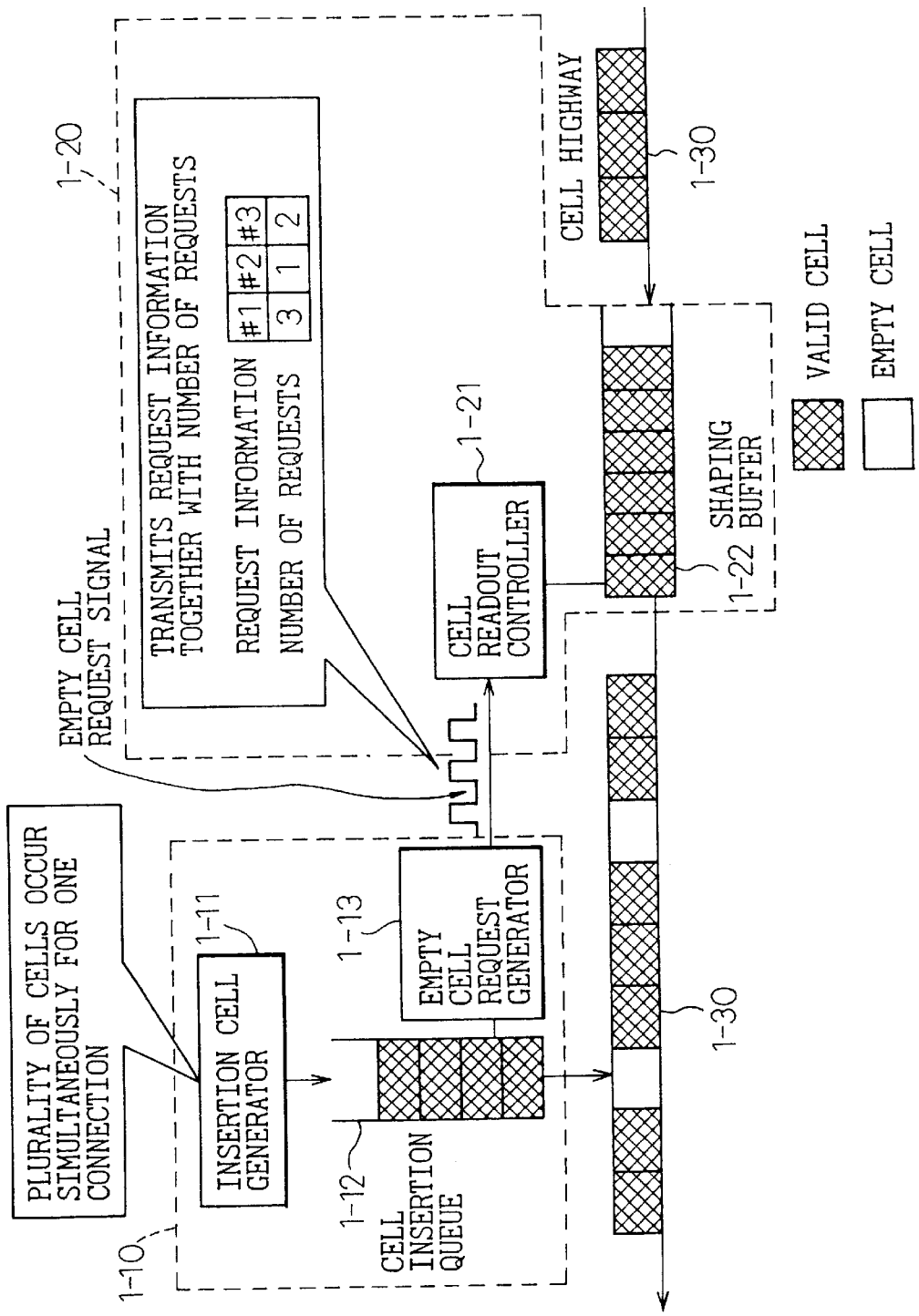
FIG. 5 is a diagram for explaining empty cell insertion when inserting a plurality of management cells on one connection according to the present invention.

FIGS. 4 and 5 are diagrams for explaining empty cell insertion when inserting a plurality of management cells on one connection according to the present invention. When consecutively inserting multiple kinds of management cells such as OAM cells, for example, an LB (Loop Back) cell and a PM (Performance Management) cell, on the same connection, the empty cell request generator 1-13 sends an empty cell request signal carrying the QoS class, line identifier, or connection identifier, repeatedly as many times as there are requested empty cells, as shown in FIG. 4.

In the example of FIG. 4, the empty cell request generator 1-13 sends the empty cell request signal to the cell readout controller 1-21, three times for connection No. 1 (indicated by #1), once for connection No. 2 (indicated by #2), and twice for connection No. 3 (indicated by #3).

When the number of patterns of the OAM cells or management cells to be inserted consecutively is small, the above arrangement for transmitting the empty cell request signal repeatedly can reduce the number of empty cell request signals to be transmitted and hence the number of signal lines for the transmission of the empty cell request. Further, since the request information is transmitted by simply arranging the information as it occurs, there is no need to merge the information relating to the plurality of OAM cells or management cells with the information carrying the number of requested empty cells; accordingly, the empty cell request signal can be transmitted by simple processing.

On the other hand, when the number of patterns of the OAM cells or management cells to be inserted consecutively is large or the consecutive insertion of the empty cell is necessary, the empty cell request generator 1-13 reports the number of requested empty cells for each connection, along with the empty cell request signal carrying the QoS class, line identifier, or connection identifier, as shown in FIG. 5.

In the example of FIG. 5, the empty cell-request generator 1-13 notifies the cell readout controller 1-21 that the number of requested empty cells (the number of times that the empty cell request is made) is 3 for connection No. 1 (indicated by #1), 1 for connection No. 2 (indicated by #2), and 2 for connection No. 3 (indicated by #3).

While the above arrangement for reporting the number of requested empty cells requires the processing for merging the information relating to the OAM cells or management cells with the information carrying the number of requested empty cells when the OAM cells or management cells to be consecutively inserted occur, the arrangement can reduce the number of empty cell request signals to be transmitted, and hence the number of signal lines for the transmission of the empty cell request, when the number of patterns of the OAM cells or management cells to be consecutively inserted is large. Further, in the shaping block 1-20, there is no need to perform high-speed processing to calculate the number of empty cell requests by counting the empty cell requests as they arrive.

Figure 6:
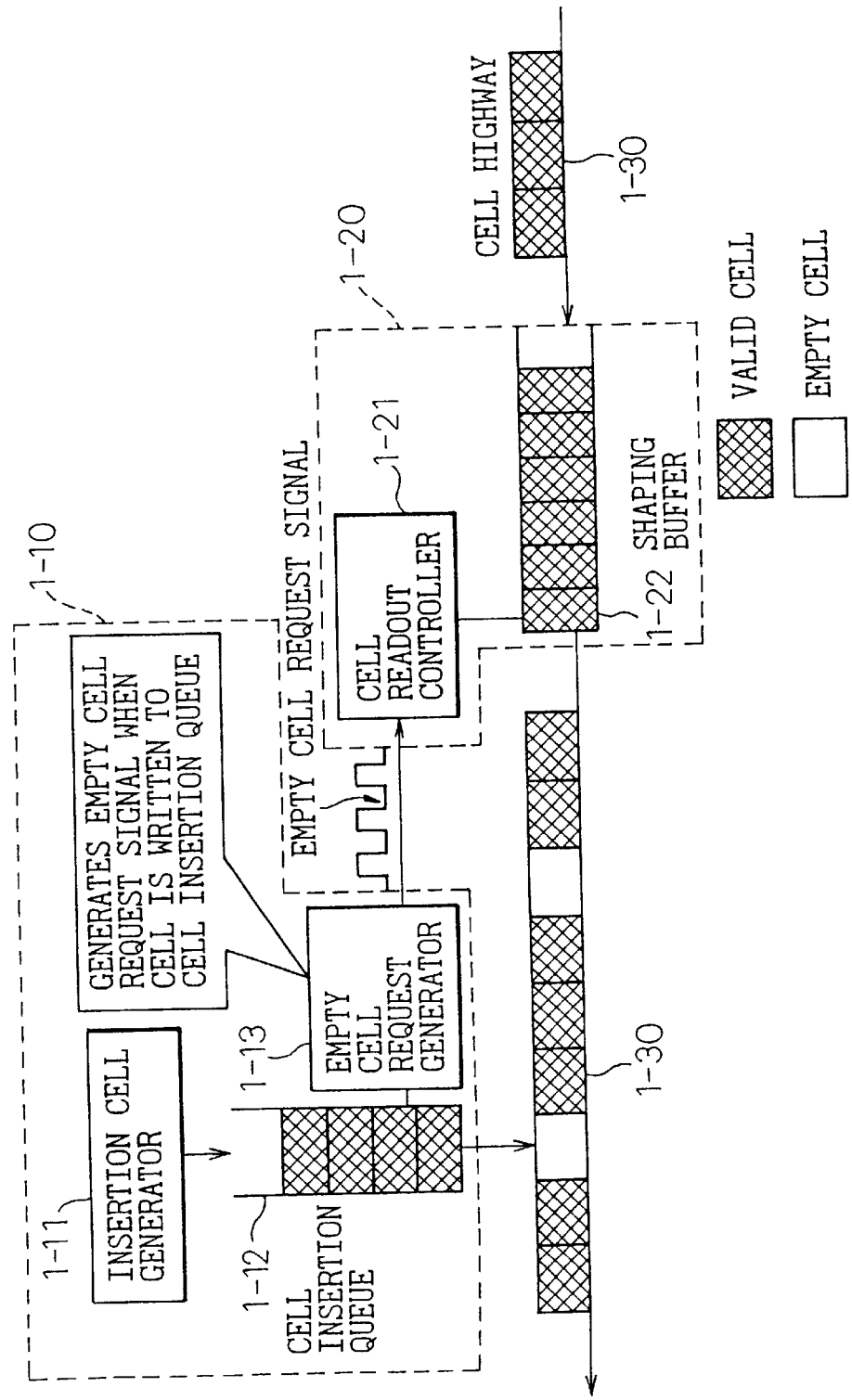
FIG. 6 is a diagram for explaining the timing for an empty cell request notification according to the present invention.
Figure 7:
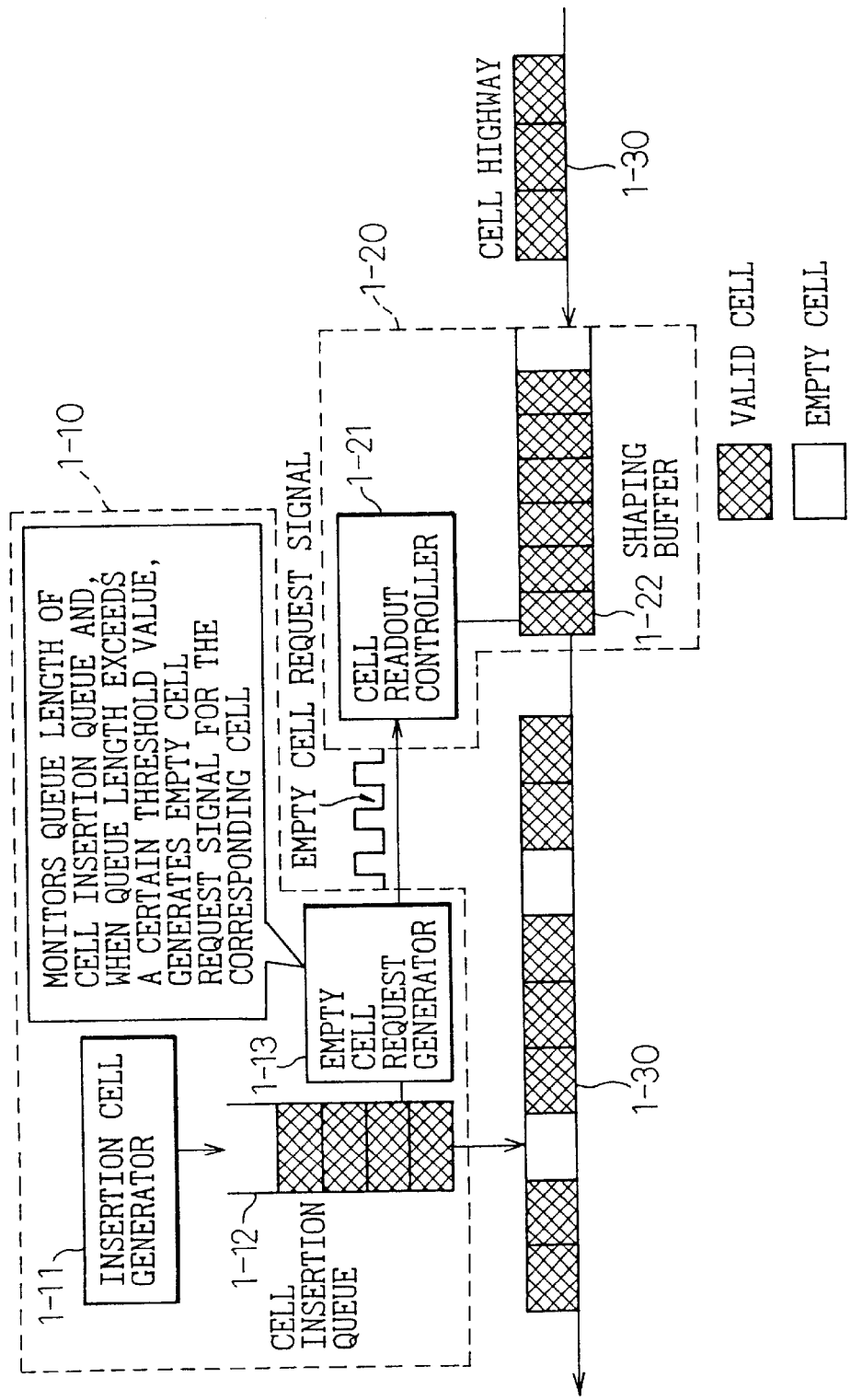
FIG. 7 is a diagram for explaining the timing for an empty cell request notification according to the present invention.

FIGS. 6 and 7 are diagrams for explaining the timing for issuing the empty cell request according to the present invention. In FIG. 6, the timing for the cell insertion block 1-10 to issue the empty cell request to the shaping block 1-20 is such that cell writing to the cell insertion queue 1-12 is monitored by the empty cell request generator 1-13 which, upon detection of the occurrence of a write to the cell insertion queue 1-12, sends the corresponding empty cell request signal.

With this configuration, since the empty cell request signal is sent out upon the occurrence of an OAM cell or management cell to be inserted, quick response can be obtained for the empty cell insertion.

In the alternative configuration shown in FIG. 7, the timing for the cell insertion block 1-10 to issue the empty cell request to the shaping block 1-20 is such that the queue length of the cell insertion queue 1-12 is monitored by the empty cell request generator 1-13, which issues the corresponding empty cell request when the queue length exceeds a predetermined threshold value.

With this configuration, unnecessary empty cell requests can be prevented from being issued in cases where an adequate number of empty cells are flowing on the highway without specifically issuing an empty cell request.

Figure 8:
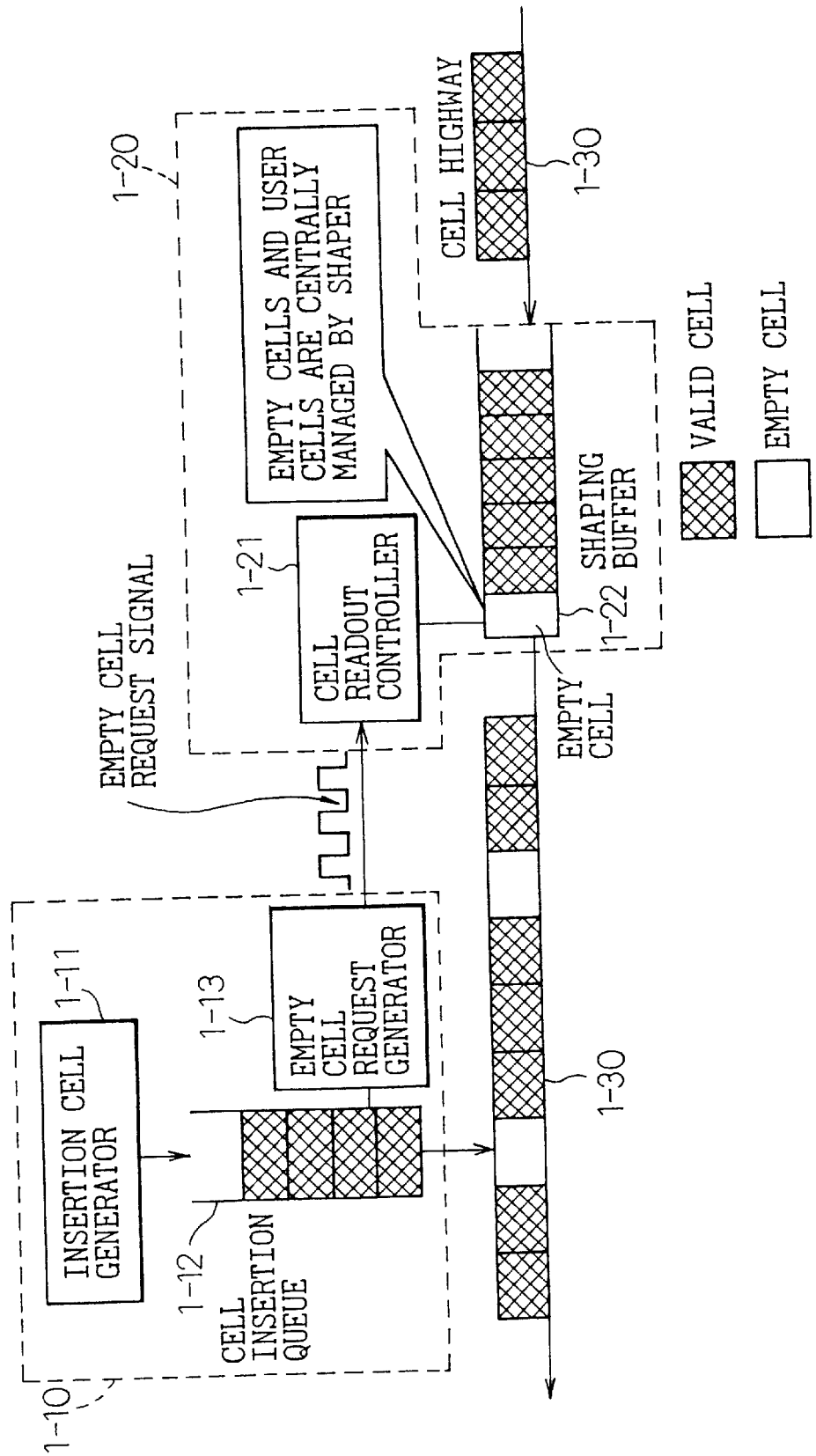
FIG. 8 is a diagram for explaining empty cell insertion performed by a shaping buffer according to the present invention.

FIG. 8 is a diagram for explaining empty cell insertion performed by the shaping buffer according to the present invention. When the empty cell request signal is received from the empty cell request generator 1-13, the cell readout controller 1-21 inserts an empty cell at the head or the tail of the stream of cells loaded in sequence into the shaping buffer 1-22.

In this way, by using the user cell shaping buffer 1-22 for empty cell insertion, and by centrally managing the transmission of user cells and empty cells by the shaping buffer 1-22, the configuration can be achieved without adding new hardware for empty cell management. Further, when an empty cell is written at the head of the shaping buffer 1-22, quick response can be obtained for the empty cell insertion.

Figure 9:
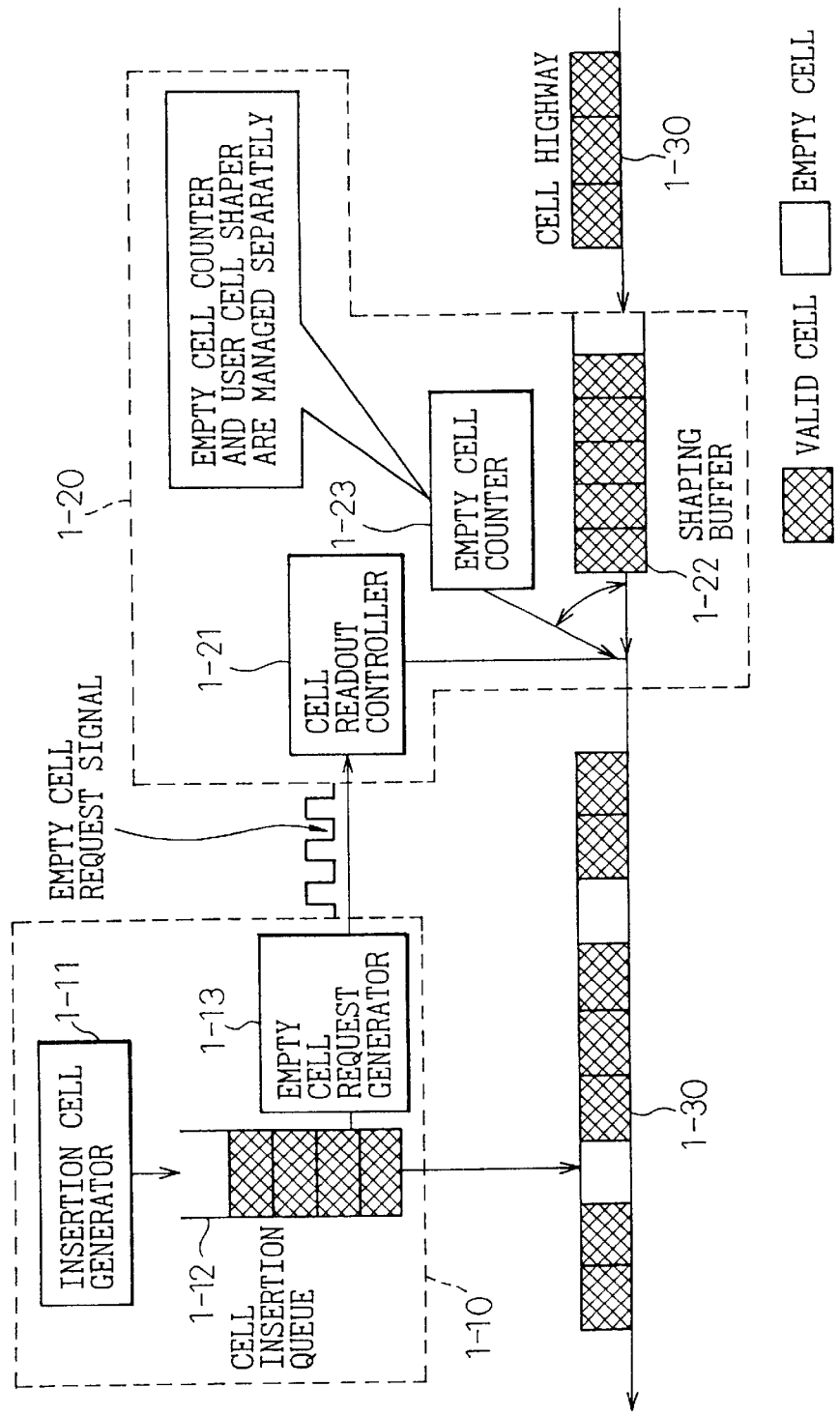
FIG. 9 is a diagram for explaining empty cell insertion performed by an empty cell counter according to the present invention.

FIG. 9 is a diagram for explaining empty cell insertion performed by an empty cell counter according to the present invention. The shaping block 1-20 includes an empty cell counter 1-23 in addition to the user cell shaping buffer 1-22 and, as the cell readout controller 1-21 receives an empty cell request signal from the empty cell request generator 1-13, the empty cell counter 1-23 counts the number of received empty cell requests and holds the count value. Herein, instead of the empty cell counter, the empty cell request queue can be used to insert the several empty cells, consecutively.

The empty cell insertion is performed based on the count value of the empty cell counter 1-23; that is, the empty cell insertion and user cell shaping are managed separately, and the empty cell insertion is performed by performing bandwidth control appropriate to the various QoS classes of the OAM cells and user cells for each line or each connection. The empty cell insertion appropriate to the various QoS classes will be described below.

FIG. 10 is a diagram for explaining how the empty cell counter performs the empty cell insertion in response to the bandwidth request for the insertion of a management cell such as an OAM cell according to the present invention. A plurality of the empty cell counters 1-23 are provided, one for each line identifier, each connection identifier, or each QoS class, and based on the respective counter values, empty cells are inserted in accordance with the bandwidth request for each line identifier, each connection identifier, or each QoS class, or for each combination of two or more of them.

In this way, by managing the empty cell insertion using the empty cell counter 1-23 provided for each line identifier, each connection identifier, or each QoS class, or for each combination of two or more of them, an empty cell can be inserted that matches the bandwidth request for the insertion of a management cell such as an OAM cell, and accordingly, a management cell such as an OAM cell that matches the bandwidth request can be inserted by the cell insertion block 1-10.

Here, the management classification for the empty cell counters 1-23 which individually hold the number of empty cell requests need not necessarily match the management classification for the shaping buffer 1-22 which reads cells from the cell highway 1-30.

FIGS. 11A and 11B are diagrams for explaining empty cell insertion responding to a request for the aggregate bandwidth of management cells such as OAM cells and user cells according to the present invention. FIG. 11A shows the cells being read out from the shaping buffer 1-22 onto the cell highway 1-30 during normal readout (when there are no empty cell requests), and FIG. 11B shows the cells being read out from the shaping buffer 1-22 and empty cell counter 1-23 onto the cell highway 1-30 when an empty cell request occurs.

When a bandwidth request is made for an aggregate of management cells such as OAM cells and user cells, if the shaping rate is, for example, $1/3$, then during usual readout only user cells are read out, at one for every three cells, for transmission onto the cell highway 1-30, as shown in FIG. 11A. At this time, the count value of the empty cell counter 1-23 is zero, and no empty cells are inserted.

On the other hand, when an empty cell request occurs, the count value of the empty cell counter 1-23 is 1 or larger; at this time, assuming that an empty cell has been read out instead of a user cell, an empty cell is inserted, and cells are read out, at one for every three cells, the empty cells and user cells combined, for transmission onto the cell highway 1-30, as shown in FIG. 11B. The user cells not read out because of the insertion of the empty cells are read out in sequence in the next readout cycle.

In this way, bandwidth control is performed by inserting empty cells by assuming that user cells have been read out, and cells are transmitted out at the desired shaping rate aggregating the requested empty cell bandwidth and user cell bandwidth. According, the bandwidth of empty cell requests and the bandwidth of user cells can be managed in an aggregate manner. This can effectively address the situation where a user declaration for required bandwidth is made in terms of the sum of the bandwidth of management cells such as OAM cells and the bandwidth of user cells.

Figures 12A, 12B:
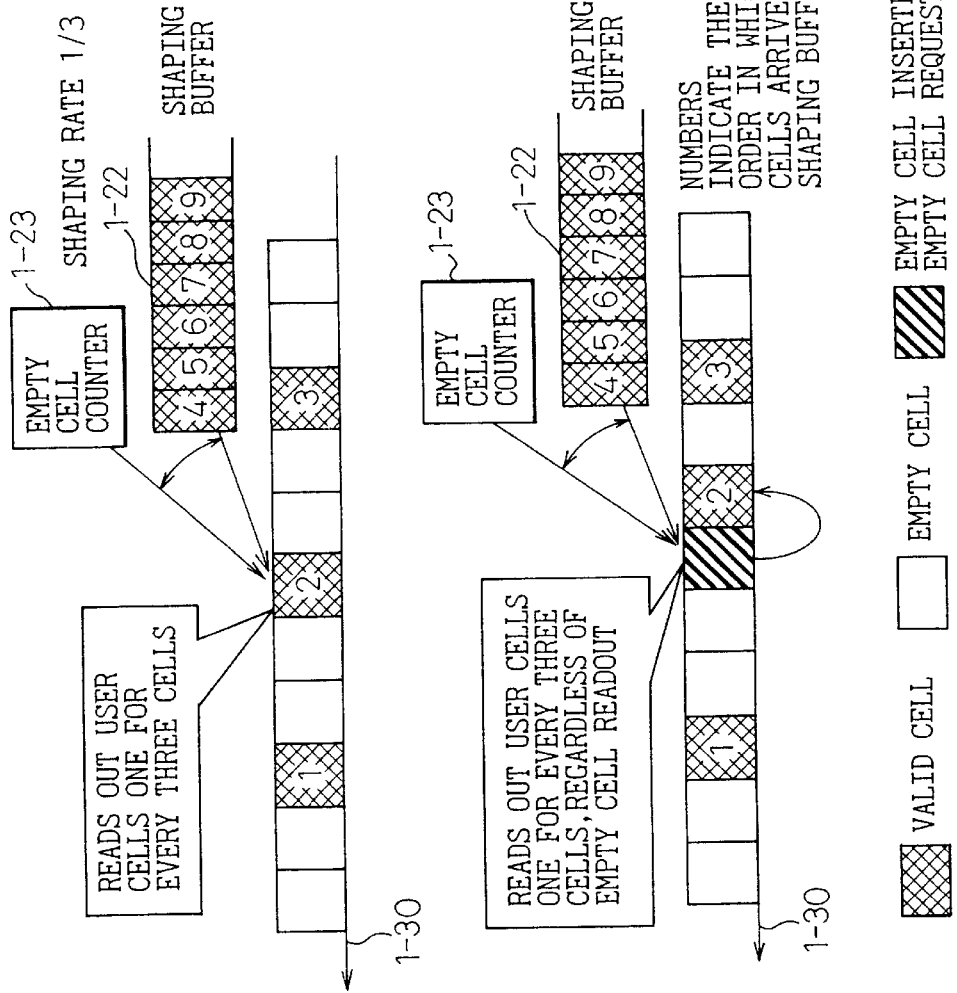
FIGS. 12A and 12B are diagrams for explaining empty cell insertion responding separately to separate bandwidth requests for management cells and user cells according to the present invention.

FIGS. 12A and 12B are diagrams for explaining empty cell insertion responding separately to separate bandwidth requests for management cells such as OAM cells and user cells according to the present invention. FIG. 12A shows the cells being read out from the shaping buffer 1-22 onto the cell highway 1-30 during normal readout (when there are no empty cell requests), and FIG. 12B shows the cells being read out from the shaping buffer 1-22 and empty cell counter 1-23 onto the cell highway 1-30 when an empty cell request occurs.

The operation during usual readout shown in FIG. 12A is the same as that shown in FIG. 11A. When an empty cell request occurs, if the insertion position of the empty cell inserted in response to the request. (the cell indicated by oblique hatching in the figure) competes with the readout position of a user cell, as shown in FIG. 12B, bandwidth control is performed assuming that the user cell has not been read out, and the user cell is read out at the next cell position.

That is, the user cells are read out, one for every three cells, regardless of the insertion of empty cells.

Since the requested empty cell bandwidth and the user cell bandwidth are separately managed as described above, this embodiment can effectively address the situation where a user declaration for required bandwidth is made for management cells, such as OAM cells, separately from user cells.

Figure 14:
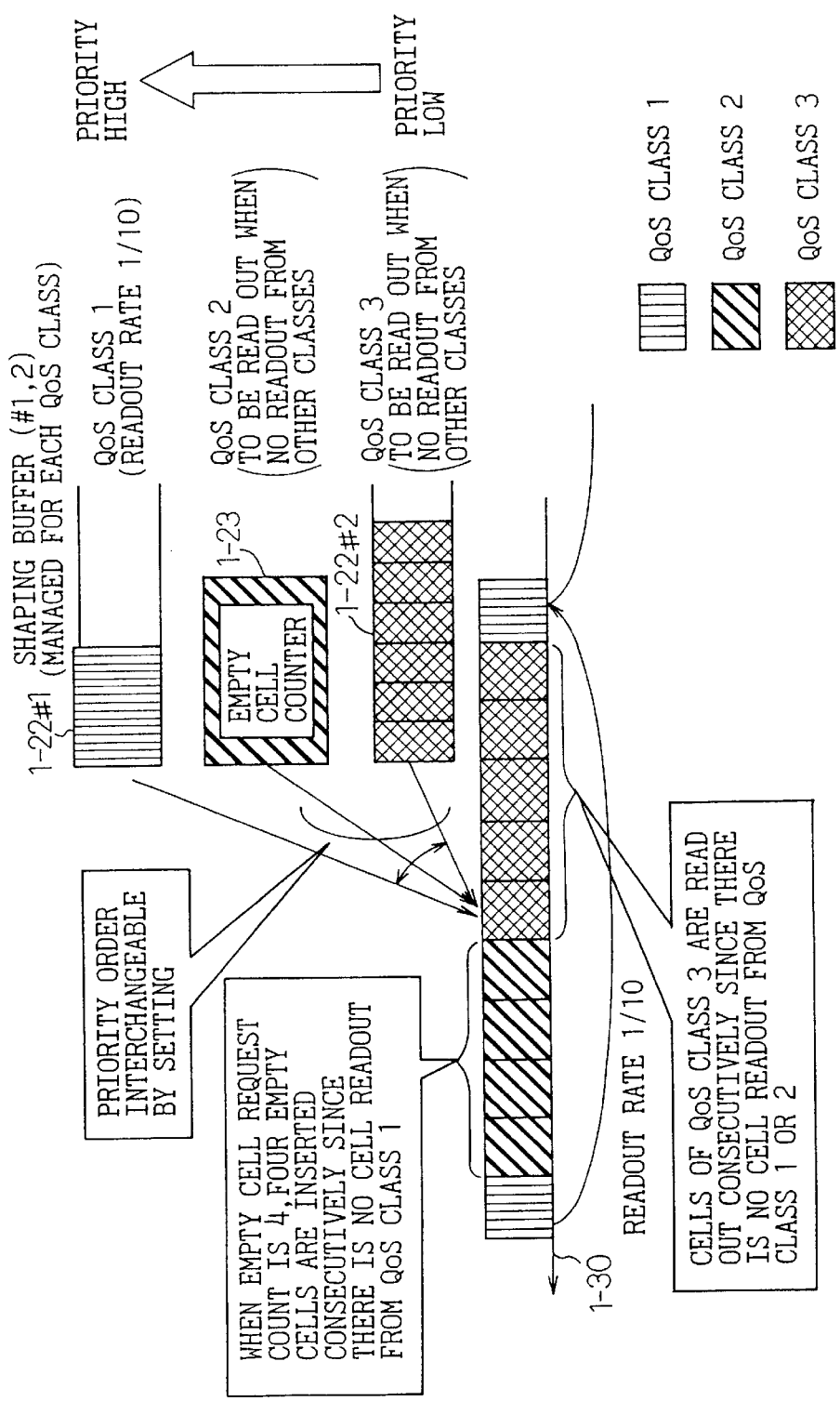
FIG. 14 is a diagram for explaining empty cell insertion performed by the empty cell counter when QoS class is assigned according to the present invention.

FIGS. 13 and 14 are diagrams for explaining empty cell insertion performed by the empty cell counter when QoS class is assigned according to the present invention. FIG. 13 shows an embodiment in which the empty cell counter is assigned a QoS class with a given readout rate and inserts empty cells at that given rate.

It is assumed here that the shaping buffer 1-22 #1, which is assigned QoS class 1 with the highest priority, the empty cell counter 1-23, which inserts empty cells and is assigned QoS class 2 with the next highest priority, and the shaping buffer 1-22 #2, which is assigned QoS class 3 with the lowest priority, respectively output cells on the cell highway 1-30.

It is also assumed that the readout rate of the shaping buffer 1-22 #1 is $1/10$ and that of the empty cell counter 1-23 is $1/4$, while the shaping buffer 1-22 #2 outputs a cell when there is no cell readout from the other two classes.

As shown in FIG. 13, the shaping buffer 1-22 #1 assigned the highest priority QoS class 1 outputs cells at the readout rate of $1/10$, that is, at a rate of one cell for every 10 cells on the cell highway, and if any output cell competes with a cell of some other QoS class, the output cell is transmitted in preference to that other cell.

The empty cell counter 1-23 assigned the second highest QoS class 2 outputs empty cells at the readout rate of $1/4$, and inserts one cell for every four cells on the cell highway. If any output cell competes with a cell of QoS class 1, the output cell is shifted one position and inserted in the next position.

The shaping buffer 1-22 #2 assigned the lowest priority QoS class 3 outputs a cell for transmission when there is no cell readout from the other two classes.

In this way, since empty cells are assigned a predetermined readout rate, the quality of management cells such as OAM cells to be inserted can be guaranteed. However, unlike the prior art configuration, the bandwidth can be allocated to user cells of the best effort service class when there are no empty cell requests.

Further, the shaping buffer can be configured to manage the readout rate of user cells for each line and for each QoS class, and the empty cell counter can be configured to manage the readout rate of empty cells only for each QoS class or for each line.

FIG. 14 shows an embodiment in which requested empty cells are assigned a QoS class different from those assigned to user cells and all requested empty cells are inserted when there is no readout from other higher priority QoS classes.

It is assumed that cells are read out at the readout rate of $1/10$ from the shaping buffer 1-22 #1 assigned the highest priority QoS class 1, while, on the other hand, from the empty cell counter 1-23 assigned the second highest priority QoS 2 and the shaping buffer 1-22 #2 assigned the lowest priority QoS class 3, cell are read out for transmission on the cell highway 1-30 when there is no cell readout from higher priority classes.

As shown in FIG. 14, the shaping buffer 1-22 #1 assigned the highest priority QoS class 1 outputs cells at a rate of one cell for every 10 cells on the cell highway, and if any output cell competes with a cell of some other QoS class, the output cell is transmitted in preference to that other cell.

The empty cell counter 1-23 of QoS class 2, when the number of empty cell requests is four, for example, inserts the requested four empty cells Consecutively when there is no cell readout from the higher priority QoS class 1.

The shaping buffer 1-22 #2 of QoS class 3 consecutively outputs cells when there is no cell readout from the higher priority QoS class 1 or 2.

In the configuration where the empty cell counter and a number of shaping buffers are assigned QoS classes such that cells are output for transmission when there is no cell readout from other higher priority QoS classes, provisions may be made so that the priority can be varied among the empty cell counter and those shaping buffers according to the quality of service provided to the user.

The above embodiment eliminates the need for a difficult task involving predicting and setting a certain empty cell readout rate for an empty cell request, and achieves efficient utilization of an available bandwidth when there is no cell readout from higher priority QoS classes.

Further, when provisions are made to interchange the priority between the empty cell counter and shaping buffer assigned QoS classes that allow cells to be read out when there is no cell readout from other higher priority QoS classes, optimum bandwidth control can be performed between requested empty cells and user cells of different QoS classes in a network providing both bandwidth guaranteed service and best effort service classified into a plurality of QoS classes.

Here, the shaping buffer can be configured to manage cell readout for each line and for each QoS class, and the empty cell counter can be configured to manage empty cell insertion only for each line or for each QoS class.

FIG. 15 is a diagram for explaining empty cell insertion when the empty cell counter of the present invention is assigned the same QoS class as that of other user cells. As shown in the figure, when the shaping buffers 1-22 #1, #2, and #3 are assigned the highest priority QoS class 1, the second highest priority QoS class 2, and the lowest priority QoS class 3, respectively, the empty cell counter 1-23 is assigned, for example, QoS class 2, the same QoS class as that of shaping buffer 1-22 #2 which is closest to the QoS class of requested empty cells.

Generally, reading out cells of different QoS classes requires the provision of a mechanism for performing contention control, which increases the amount of hardware for QoS class control, but by assigning the empty cell counter the same QOS level as the QoS class of other user cells, it becomes possible to share the existing QoS class control between the empty cells and user cells, and quality for requested empty cells can thus be guaranteed.

Between the requested empty cells and user cells of the same QoS class, readout priority is predetermined, and the QoSs of the requested empty cells and the user cells are centrally managed. This simplifies control for empty cell insertion.

In an alternative configuration, a readout ratio is predetermined between the requested empty cells and user cells of the same QoS class, and the empty cells and user cells are read out alternately in accordance with the predetermined ratio.

When centrally managing the QoSs of the requested empty cells and the user cells, the readout patterns of the requested empty cells and the user Cells can be defined in further detail, but in the configuration where the readout ratio between the user cells and management cells such as OAM cells is defined, as just described, empty cell insertion control can be accomplished just by adding simple hardware such as a counter.

Alternatively, the requested empty cells may be assigned QoS classes selected from among several other user cell QoS classes. With such a configuration, requests for empty cells of different QoS classes assigned as necessary can be managed centrally, and the amount of hardware for empty cell insertion can be reduced.

FIG. 16 is a diagram showing a first embodiment of the present invention. The embodiment concerns an example in which the bandwidth of OAM cells of QoS #1 providing a quality guaranteed service is guaranteed while, on the other hand, when inserting no OAM cells, user cells of a connection of QoS #2 providing a best effort service are transmitted by making effective use of the OAM cell bandwidth.

When an OAM cell is generated by an OAM cell generator 16-1, the OAM cell is written to a cell insertion queue 16-2. An empty cell request generator 16-3 monitors the OAM cell being written to the cell insertion queue 16-2, and issues an empty cell request signal 16-4 associated with that OAM cell to a cell readout controller 16-5.

The cell readout controller 16-5 that received the empty cell request notifies an empty cell information holding counter 16-6 holding the number of requested empty cells, then adjusts the insertion timing against the user cells accumulated in a shaping buffer 16-7, and issues an instruction to a selector 16-8 to select and read out an empty cell or a user cell.

The selector 16-8 reads out an empty cell or a user cell in accordance with the readout selection instruction from the cell readout controller 16-5 and, at given timing, inserts the empty cell on a cell highway 16-9 instead of inserting the user cell.

A cell insertion controller 16-10 detects the empty cell inserted on the cell highway 16-9, reads out the OAM cell stored in the cell insertion queue 16-2, and inserts the readout OAM cell to overwrite the empty cell.

With this series of control operations, while insuring the bandwidth for OAM cell insertion, when no OAM cells are being inserted, the unused bandwidth can be allocated to the QoS class providing the best effort service.

Here, the OAM cell generator 16-1 may be configured to generate cells of other purposes than the OAM cell, for example, the RM (Resource Management) cell, in which case also the insertion can likewise be accomplished.

Further, for the cells inserted by the shaping buffer 16-7, cells with lower priority than the OAM cell or local cells used for communication between the shaping block and the OAM cell insertion block may be used instead of user cells.

In FIG. 16, a plurality of the cell insertion queues 16-2 and a plurality of the empty cell information holding counters 16-6 are provided, one for each QoS class, but they may be provided as single elements, respectively, rather than separating them according to the QoS class of the OAM cell, in which case the amount of hardware can be reduced.

If the QoS class number (QoS #1 or QoS #2) is transmitted as the empty cell request signal 16-4 from the empty cell request generator 16-3, the cell readout controller 16-5 can insert an empty cell corresponding to the reported QoS class and can secure a bandwidth for the insertion of the OAM cell of the corresponding QoS class.

Furthermore, if a line identifier indicating a physical line number is transmitted as the empty cell request signal 16-4 from the empty cell request generator 16-3, the cell readout controller 16-5 can insert an empty cell corresponding to the reported line number and can secure a bandwidth for the insertion of the OAM cell of the corresponding line number.

This configuration can be easily accomplished by replacing the QoS class numbers (QoS #1 and QoS #2) shown in FIG. 16 by line numbers, and is effective when the shaping buffer 16-7 is a shaper for smoothing the cell flow to the physical line speed.

Alternatively, if a connection identifier indicating a connection number is transmitted as the empty cell request signal 16-4 from the empty cell request generator 16-3, the cell readout controller 16-5 can insert an empty cell corresponding to the reported connection and can secure a bandwidth for the insertion of the OAM cell of the corresponding connection.

This configuration can be easily accomplished by replacing the QoS class numbers (QoS #1 and QoS #2) shown in FIG. 16 by connection identifiers, and is effective when the shaping buffer 16-7 is a VC/VP shaper for smoothing the cell flow on a connection-by-connection basis.

Moreover, if all of the QoS class number, line identifier, and connection identifier, or a combination of two of them, are transmitted as the empty cell request signal 16-4 from the empty cell request generator 16-3, the cell readout controller 16-5 can insert an empty cell corresponding to the reported parameters and can secure a bandwidth for the insertion of the corresponding OAM.

The embodiment shown in FIG. 16 concerns a configuration example in which the writing of an OAM cell to the cell insertion queue 16-2 is monitored by the empty cell request generator 16-3 which generates the empty cell request signal 16-4 by reading from the OAM cell the QoS class, line identifier, or connection identifier necessary for the empty cell request.

As described above, the writing of an OAM cell to the cell insertion queue 16-2 is monitored, and the empty cell request signal 16-4 is generated when the writing is done; therefore, in a situation where a new OAM cell occurs when the cell insertion queue 16-2 is full, and the OAM cell is, therefore, not written to the cell insertion queue 16-2 but is discarded, an unnecessary empty cell request is not generated for the discarded OAM cell, because the empty cell request signal 16-4 is generated only when writing is done to the cell insertion queue 16-2.

FIG. 17 is a diagram showing a second embodiment of the present invention. This embodiment concerns an example in which different bandwidth controls are performed for different QoS classes, different lines, or different connections. In the illustrated embodiment, line #1 accommodates connection VC #1 whose QoS class is QoS #1. Further, line #2 accommodates three connections VC #2 to #4, the QoS class being QoS #1 for the connection VC #2 and QoS #2 for the connections VC #3 and #4.

Accordingly, four cell insertion queues 17-2 and four shaping buffers are provided, one for each of the connections VC #1 to VC #4; likewise, empty cell information holding counters 17-6 are provided, one for each QoS class, each line, or each connection, or for each combination of them. Otherwise, the configuration is the same as that shown in FIG. 16.

In this embodiment, the QoS class number, line identifier, or connection identifier, or a combination of two or more of them, is transmitted as the empty cell request signal 17-4, in accordance with which the cell readout controller 17-5 issues a cell readout selection instruction for insertion of an empty cell corresponding to the QoS of the reported line or connection.

Figure 18A:
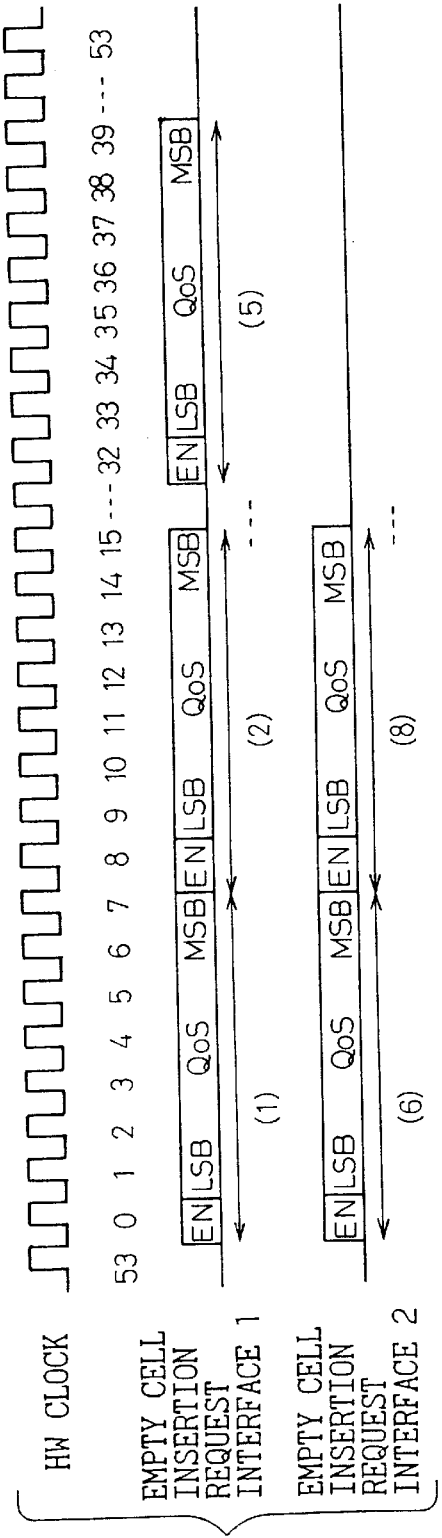
FIGS. 18A and 18B are diagrams each showing an example of the format of an empty cell request signal according to the present invention.
Figure 18B:
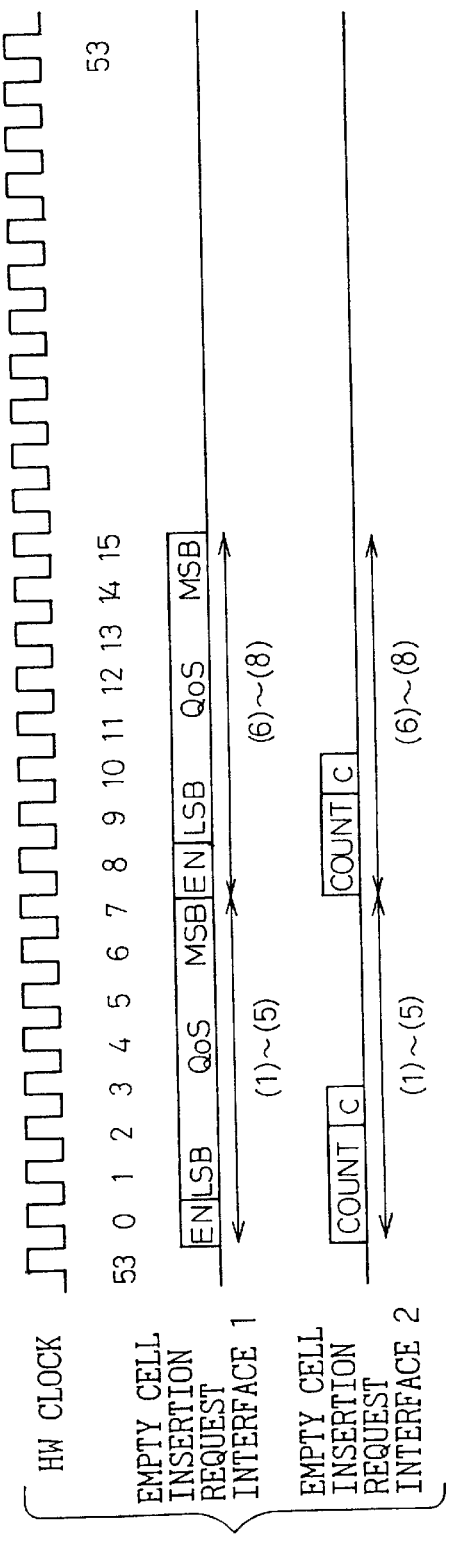

FIGS. 18A and 18B are diagrams each showing an example of the format of the empty cell request signal according to the present invention. FIG. 18A shows an example of the format in which the empty cell request signal is sent out repeatedly as many times as there are requested empty cells, while FIG. 18B shows an example of the format in which the empty cell request signal is sent out together with the number of requested empty cells.

In the figures, HW clock is a cell highway data synchronization signal, and the empty cell request signal is sent out in synchronism with the HW clock. Here, the empty cell request signal is transmitted from the empty cell request generator to the cell readout controller via two signal paths, an interface 1 and an interface 2.

Assuming as a simultaneous cell insertion pattern the case of inserting eight OAM cells consisting, for example, of (1) AIS cell, (2) LB cell, (3) forward PM cell, (4) CC cell, (5) ACT/DACT cell, (6) RDI cell, (7) LB loopback cell, and (8) backward PM cell, FIG. 18A shows an example in which a request for empty cells is made by transmitting one after another eight enable flags EN (1: ENABLED, 0: DISABLED) for the data together with the QoS class numbers corresponding to the respective OAM cells.

In the example of FIG. 18B, which also assumes as a simultaneous cell insertion pattern the case of inserting the OAM cells (1) to (8) described above, the OAM cells are classified into two types, the OAM cells (1) to (5) of the forward transmitting type and the OAM cells (6) to (8) of the loopback type (since, usually, the QoS class number of the forward transmitting type OAM cells is different from the QoS number of the loopback type OAM cells), and empty cell request information consisting of enable flags EN for the data and the QoS class numbers corresponding to the two types of OAM cells and consecutive indicator C (C=0; no consecutive empty cell request, C=1; consecutive empty cell request) is transmitted via the interface 1, while their empty cell request counts are transmitted via the interface 2.

Instead of using the enable flag EN, the count of the number of empty cell requests can be substituted for the enable flag EN, such that empty cell request count=0 means DISABLE and empty cell request count=1 means ENABLE.

Further, instead of adding a new interface, such as the cell highway data synchronization signal, synchronized to the cell highway clock, a cell highway directed in the direction opposite to the direction of cell insertion, can be used.

Figure 20:
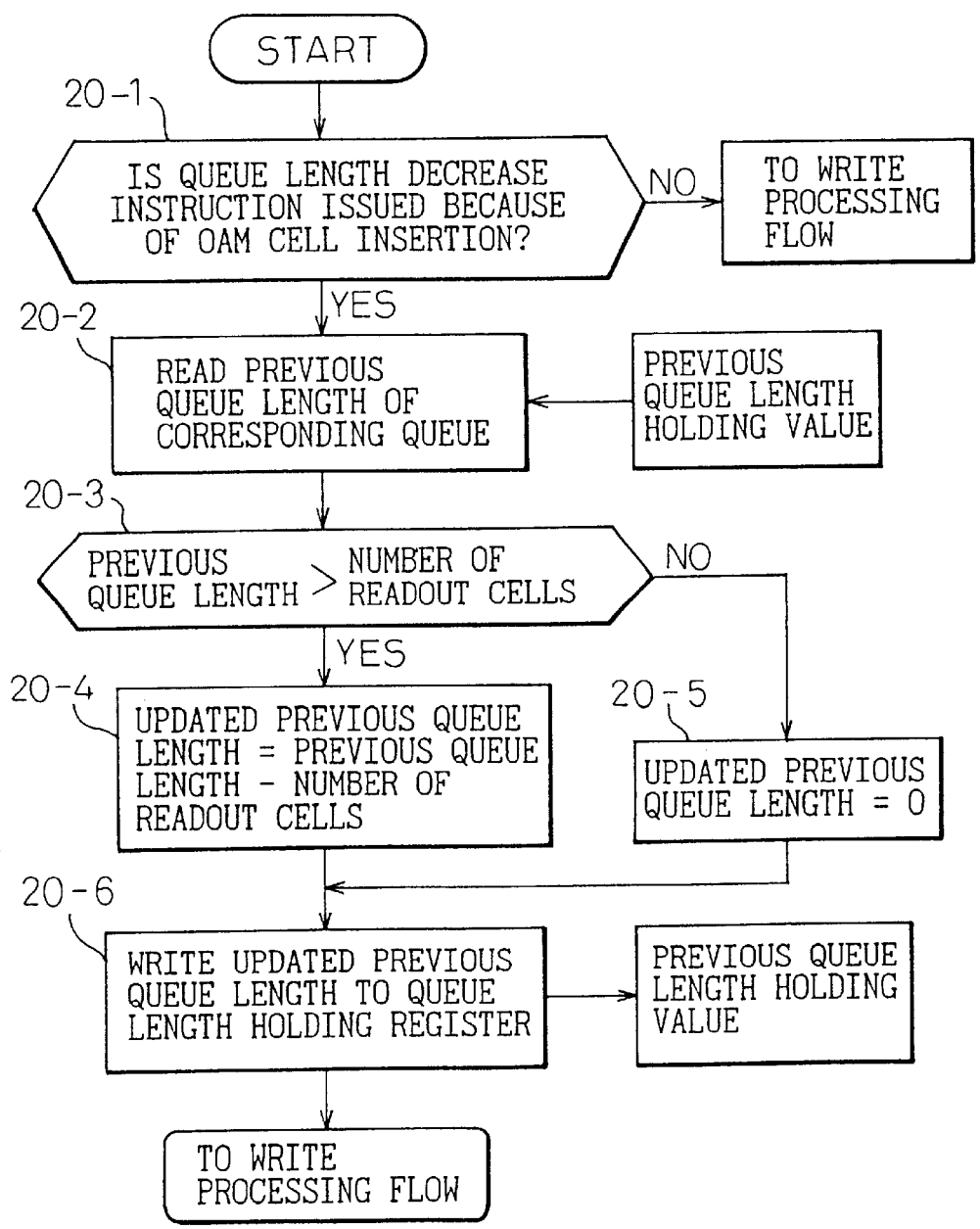
FIG. 20 is a diagram showing a flow for queue length monitoring when reading out a cell insertion queue according to the present invention.
Figure 21:
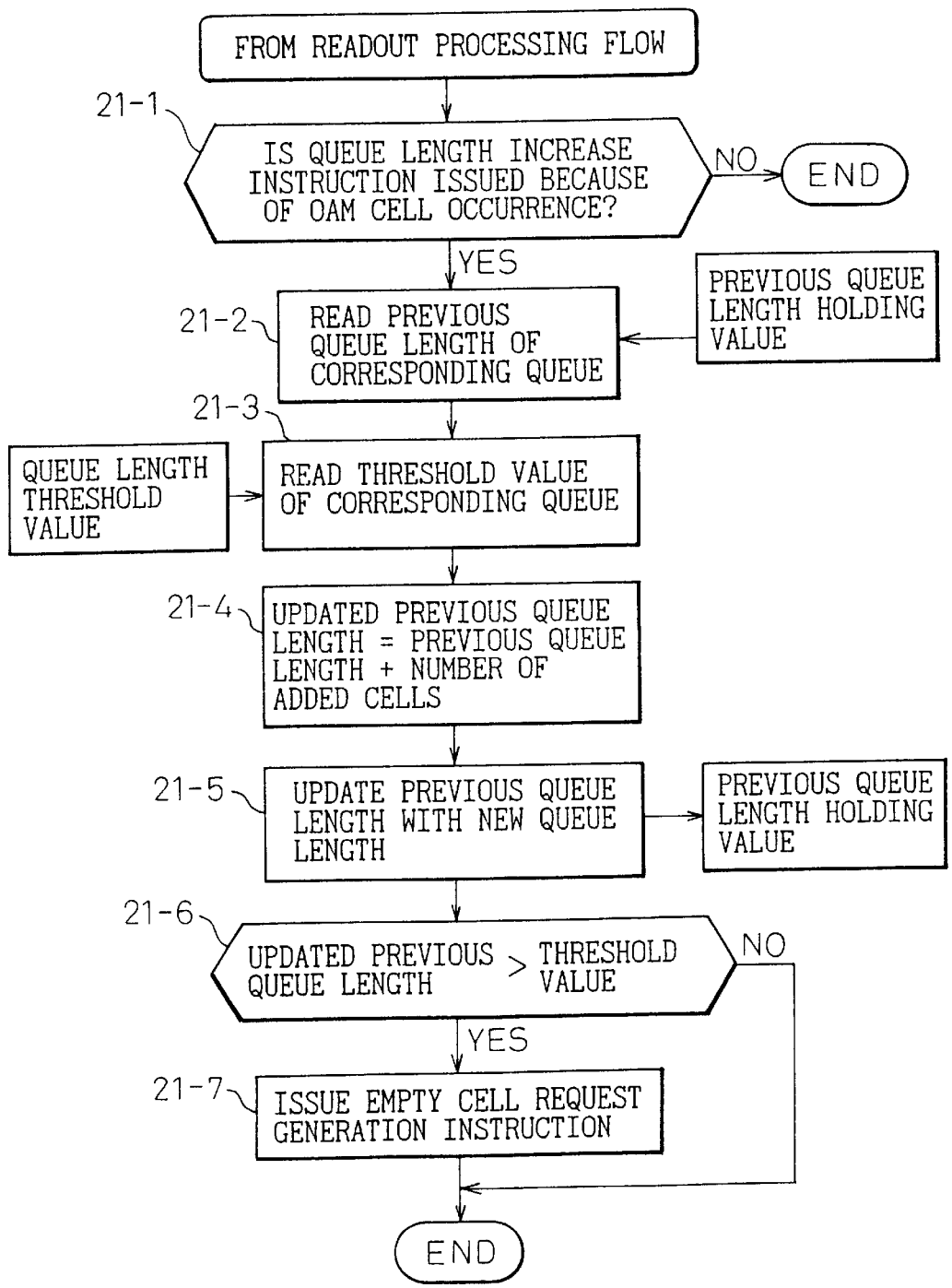
FIG. 21 is a diagram showing a flow for queue length monitoring when reading out the cell insertion queue according to the present invention.

FIG. 19 is a diagram showing a third embodiment of the present invention. This embodiment concerns an example in which the empty cell request is issued by monitoring the queue length of the cell insertion queue. FIGS. 20 and 21 show processing flows for monitoring the queue length and issuing the empty cell request based on the monitoring of the queue length: FIG. 20 illustrates the flow when reading out the cell insertion queue and FIG. 21 the flow when writing to the cell insertion queue. The third embodiment of the present invention will be described below with reference to FIGS. 19 to 21.

When a cell insertion controller 19-10 reads a cell from a cell insertion queue 19-2, inserts the cell on a cell highway 19-9, and issues a queue length decrease instruction (processing flow 20-1), the number of cells read from the cell insertion queue 19-2 (usually 1 because an insertion is carried out once in each cell time) is reported to a queue length monitor 19-11.

The queue length monitor 19-11 reads out the previous queue length of the corresponding queue from a previous queue length holding register 19-12 (processing flow 20-2), compares the number of readout cells with the previous queue length (processing flow 20-3), subtracts the number of readout cells from the previous queue length when the previous queue length is greater than the number of readout cells (processing flow 20-4), sets the queue length to 0 when the previous queue length is not greater than the number of readout cells (processing flow 20-5), and stores the new queue length as the previous queue length value in the previous queue length holding register 19-12 (processing flow 20-6).

After the processing flow 20-6, or when there is no queue length decrease instruction in the processing flow 20-1, the process proceeds to the write flow of FIG. 21.

The queue length monitor 19-11 monitors an OAM cell being generated by the OAM cell generator 19-1 and written to the cell insertion queue 19-2; when a queue length increase instruction is issued (processing flow 21-1), the queue length monitor 19-11 reads out the previous queue length of the corresponding queue from the previous queue length holding register 19-12 (processing flow 21-2) and the corresponding queue length threshold value from a queue length threshold value holding register 19-13 (processing flow 21-3), calculates the new queue length by adding the number of newly written cells to the previous queue length (processing flow 21-4), and updates the previous queue length with the new queue length which is now stored as the previous queue length holding value (processing flow 21-5).

The queue length monitor 19-11 compares the updated previous queue length with the queue length threshold value prestored for the corresponding queue (processing flow 21-6) and, when the updated previous queue length is greater than the queue length threshold value, issues an empty cell request generation instruction to an empty cell request generator 19-3 to generate an empty cell request signal carrying the QoS class, line identifier, or connection identifier of the corresponding queue. The empty cell request generation instruction is not issued when the updated previous queue length is not greater than the queue length threshold value.

Since the queue readout flow of FIG. 20 and the queue write flow of FIG. 21 are respectively independent events, the order of the queue readout flow and the queue write flow can be interchanged, but by carrying out the queue readout flow before the queue write flow, an unnecessary empty cell request generation instruction can be prevented from being issued erroneously.

When setting the queue length threshold value, if the threshold value is set small for the cell insertion queue of the quality guaranteed service (QoS #1) and large for the cell insertion queue of the best effort service (QoS #2), for example, the delay time of the empty cell request control can be varied according to the QoS class.

Figure 22:
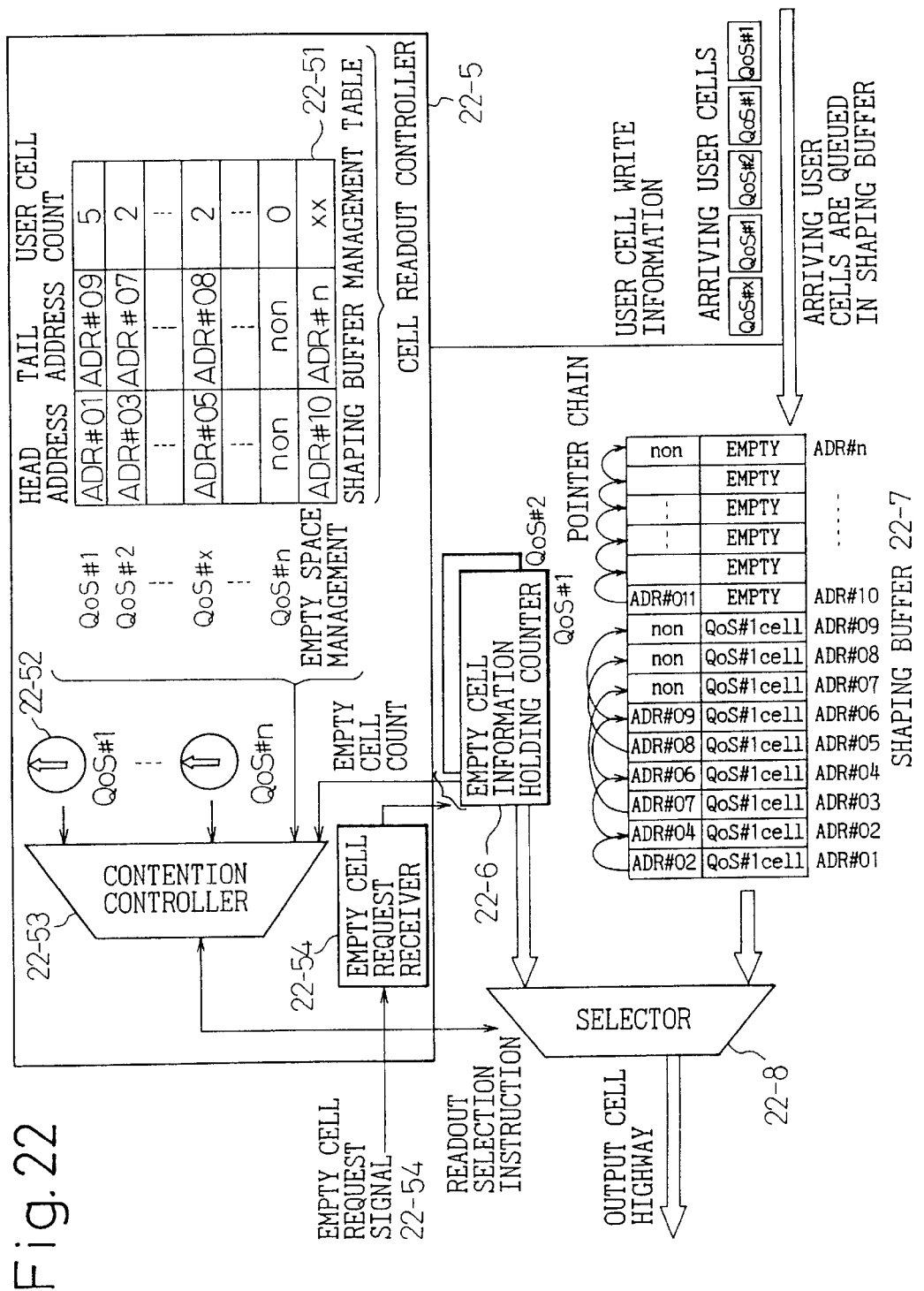
FIG. 22 is a diagram showing the configuration of a shaping block according to the present invention.
Figure 23:
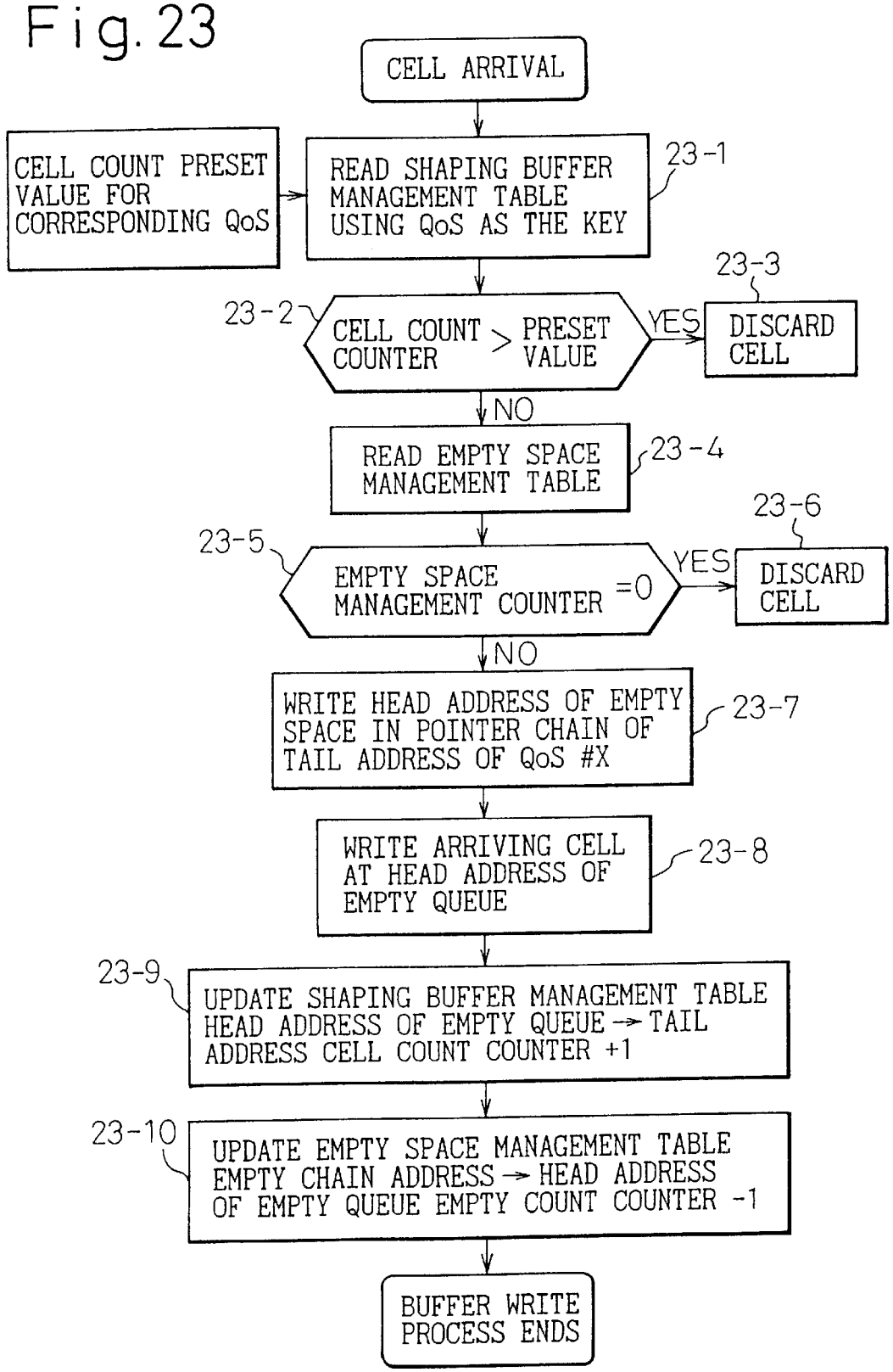
FIG. 23 is a diagram showing a write processing flow for the shaping buffer of the present invention at the time of a user cell arrival.
Figure 24:
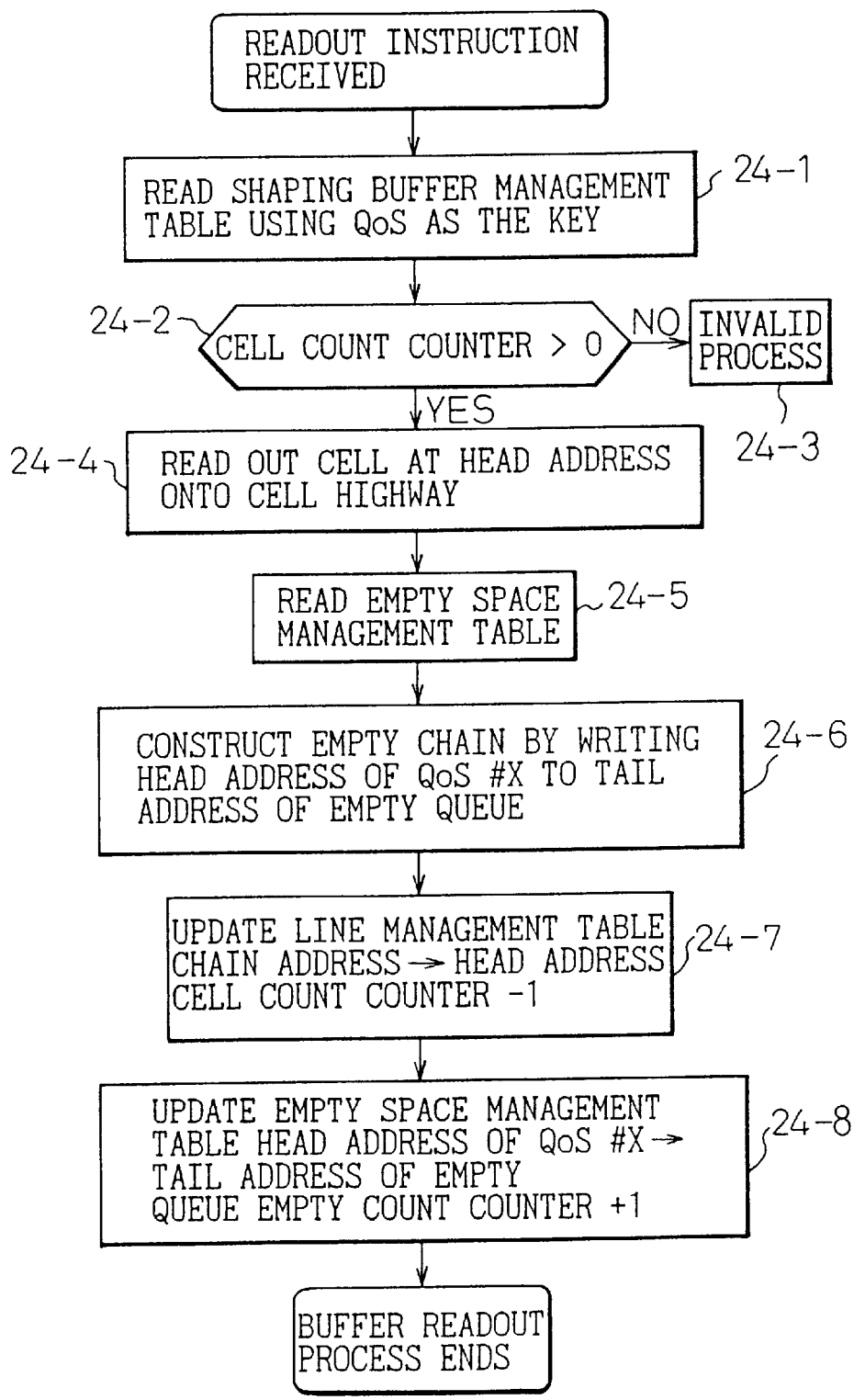
FIG. 24 is a diagram showing a user cell readout processing flow for the shaping buffer of the present invention.

FIG. 22 is a diagram showing the configuration of the shaping block according to the present invention. FIGS. 23 to 26 show shaping buffer control flows: FIG. 23 illustrates a write-processing flow at the time of a user cell arrival, FIG. 24 depicts a user cell readout processing flow, and FIGS. 25 and 26 concern readout selection instruction processing flows.

User cells arriving from the cell highway are sequentially written to the shaping buffer 22-7 for queuing. At this time, a shaping buffer management table 22-51 in the cell readout controller 22-5 is updated in accordance with the processing flow shown in FIG. 23.

When a cell arrives, the shaping buffer management table 22-51 is read using the QoS class number as the key (processing flow 23-1). The shaping buffer management table 22-51 consists of a line management table, in which the head address and tail address of a user cell queue and a count of the number of user cells are stored for each QoS class number, and an empty space management table for managing empty space available in the shaping buffer.

In the processing flow 23-1, the cell count preset value for the corresponding QoS class number is also read out; then, the cell count preset value is compared with a counter value representing a count of the number of user cells (processing flow 23-2), and if the counter value of the user cell count is larger than the cell count preset value, the arriving user cell is discarded (processing flow 23-3).

If the counter value of the user cell count is not larger than the cell count preset value, the empty space management table is read (processing flow 23-4), and if an empty space management counter counting the number of empty cells in the shaping buffer indicates 0 (processing flow 23-5), the arriving user cell is discarded (processing flow 23-6).

If the empty space management counter indicates 1 or a larger value (processing flow 23-5), the head address of an available buffer space is written in the pointer chain of the tail address for the corresponding QoS class number (processing flow 23-7), and the arriving user cell is written at the head address of an empty queue (processing flow 23-8).

To update the line management table in the shaping buffer management table 22-51, the head address of the empty queue is set as the tail address for the corresponding QoS class number, and the user cell count for that QoS class number is incremented by 1 (processing flow 23-9).

To update the empty space management table, the address next to the empty chain is set as the head address of the empty queue, and the empty count counter is decremented by 1 (processing flow 23-10), to terminate the write process of the shaping buffer 22-7.

When a user cell readout instruction is issued to the shaping buffer 22-7, the shaping buffer management table 22-51 is read using the QoS class number as the key (processing flow 24-1). If the counter value of the user cell count in the table is 0 or less (processing flow 24-2), the process is invalidated (processing flow 24-3); if the counter value of the user cell count is larger than 0 (processing flow 24-2), the user cell at the head address is read out onto the highway (processing flow 24-4).

The empty space management table is read (processing flow 24-5), and the head address of the corresponding QoS class number is written to the tail address of the empty queue to construct an empty chain (processing flow 24-6).

To update the line management table, the next chain address is set as the head address, and the counter value of the user cell count is decremented by 1 (processing flow 24-7). To update the empty space management table, the head address of the corresponding QoS class number is written to the tail address of the empty queue, and the empty count counter is incremented by 1 (processing flow 24-8), to terminate the process.

The requested empty cells reported by the empty cell request signal 22-4 are first received by an empty cell request receiver 22-54, and the number of newly requested empty cells is added to the corresponding empty cell information counter 22-6.

A contention controller 22-53 determines the cell to be read out, based on the cell readout request from a scheduling counter for the corresponding QoS class number, the requested empty cell information from the empty cell information holding counter 22-6, and the user cell count information in the shaping buffer management table 22-51, and issues a readout selection instruction to a selector 22-8 which, in response, reads out a user cell from the shaping buffer 22-7 or an empty cell from the empty cell counter for output on the output cell highway.

By managing empty cells using the empty cell information holding counter 22-6 separately from the shaping buffer 22-7, QoS control with a high degree of freedom can be performed between empty cells and user cells.

By writing insertion empty cells to the shaping buffer 22-7 based on the received empty cell request signal in the same manner as when writing arriving user cells, the configuration for managing the insertion of requested empty cells can be accomplished.

When writing an insertion empty cell, the requested empty cell can be added at the head or the tail of the shaping buffer 22-7 by writing the empty cell at the head address or the tail address.

When there are many requested empty cells to be inserted simultaneously for the same QoS number, if provisions are made to write the number of repetitions in the empty cell information written to the shaping buffer 22-7, and to not update the pointer chain during the reading of the empty cell information until the number of repetitions is reached, the number of accesses to the shaping buffer 22-7 can be reduced compared with the case where writing is done to the shaping buffer 22-7 consecutively as many times as there are, requested empty cells.

When the QoS class number (e.g., QoS #1 or QoS #2) is transmitted as the empty cell request signal 22-4, the empty information holding counter 22-6 can be configured to manage the requested empty cells for each QoS class number; when a line identifier indicating a physical line number is transmitted as the empty cell request signal 22-4, the empty information holding counter 22-6 can be configured to manage the requested empty cells for each line number; and when a connection identifier indicating a connection number is transmitted as the empty cell request signal 22-4, the empty information holding counter 22-6 can be configured to manage the requested empty cells for each connection identifier.

When all of the QoS class number, line identifier, and connection identifier, or a combination of two of them, are transmitted as the empty cell request signal 22-4, the empty information holding counter 22-6 can be configured to manage the requested empty cells corresponding to each of them.

Further, instead of providing the empty cell information holding counter 22-6 independently, the empty cells may be written to the shaping buffer so that the empty cells and user cells can be managed together.

In the configuration where the empty cell information holding counter 22-6 and the shaping buffer 22-7 are provided separately, the empty cell information holding counter 22.-6 can be configured to manage the cells for each line identifier and the shaping buffer 22-7 to manage the cells for each QoS class number and each line identifier so that the cells can be managed by combinations of various parameters.

As for the method of managing the empty cell bandwidth, if bandwidth control is performed by assuming that a user cell has been read out when inserting a requested empty cell, a configuration can be achieved that sends out cells at the shaping rate determined by combining the bandwidth of the requested empty cells with the bandwidth of the user cells.

In this configuration, when the scheduling counter 22-52, which defines the insertion interval of the corresponding user cells, has expired by counting up to the value at which a user cell is to be read out, if the contention controller 22-53 issues an instruction to select the insertion of an empty cell instead of a user cell, the scheduling counter 22-52 is reset by assuming that the user cell has been read out, and starts counting the insertion time for the next user cell.

Figure 25:
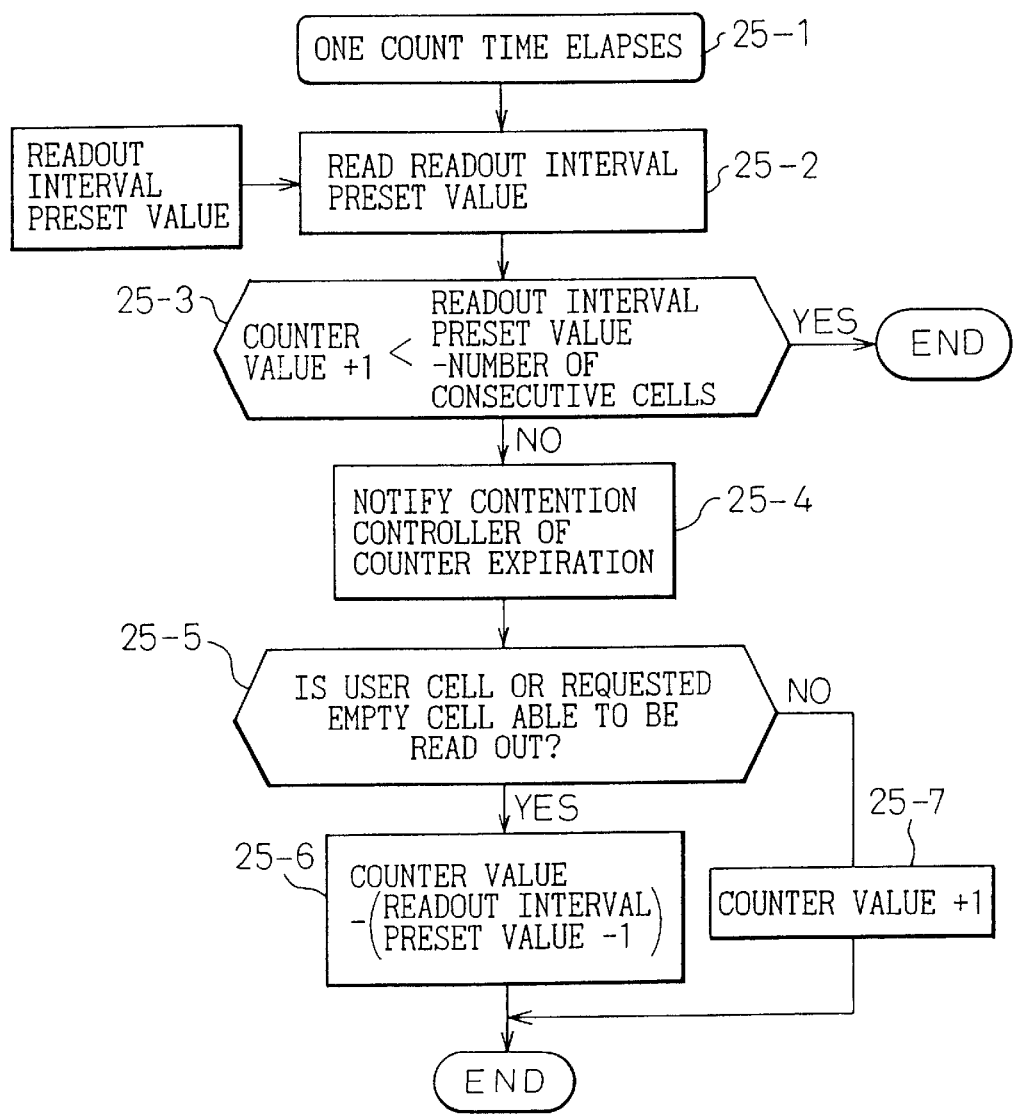
FIG. 25 is a diagram showing a readout selection instruction processing flow for the shaping block of the present invention.

FIG. 25 is a diagram illustrating a processing flow when the shaping rate is determined by combining the empty cell bandwidth with the user cell bandwidth according to the present invention. When one count time has elapsed (processing flow 25-1), the scheduling counter 22-52 reads the readout interval preset value (processing flow 25-2); then, the counter value of the scheduling counter 22-52 is incremented by 1 and compared with the readout interval preset value minus the number of consecutive cells (processing flow 25-3), and if the incremented counter value is less than the readout interval preset value, the process is terminated.

If the counter value incremented by 1 is not less than the readout interval preset value, the scheduling counter 22-52 notifies the contention controller 22-53 of the counter expiration (processing flow 25-4). If a user cell or a requested empty cell is able to be read out (processing flow 25-5), the empty cells are read out by the number of consecutive cells and the counter value is decreased by the read out internal preset value minus 1 (processing flow 25-6); if neither a user cell nor a requested empty cell is able to be read out (processing flow 25-5), the counter value is incremented by 1 (processing flow 25-7), and the process is terminated.

As for the method of managing the empty cell bandwidth, if bandwidth control is performed by determining that a user cell has not been read out when inserting a requested empty cell, a configuration can be achieved that sends out respective cells at respective shaping rates by separating the bandwidth of the requested empty cells from the bandwidth of the user cells.

In this configuration, when the scheduling counter 22-52, which defines the insertion interval of the corresponding user cells, has expired by counting up to the value at which a user cell is to be read out, if the contention controller 22-53 issues an instruction to select the insertion of an empty cell instead of a user cell, the scheduling counter 22-52 is not reset, so that, at the next timing, the scheduling counter 22-52 again expires to set the timing for a user cell to be read out, thus sending out the user cell in the bandwidth allocated separately from the empty cell bandwidth.

Figure 26:
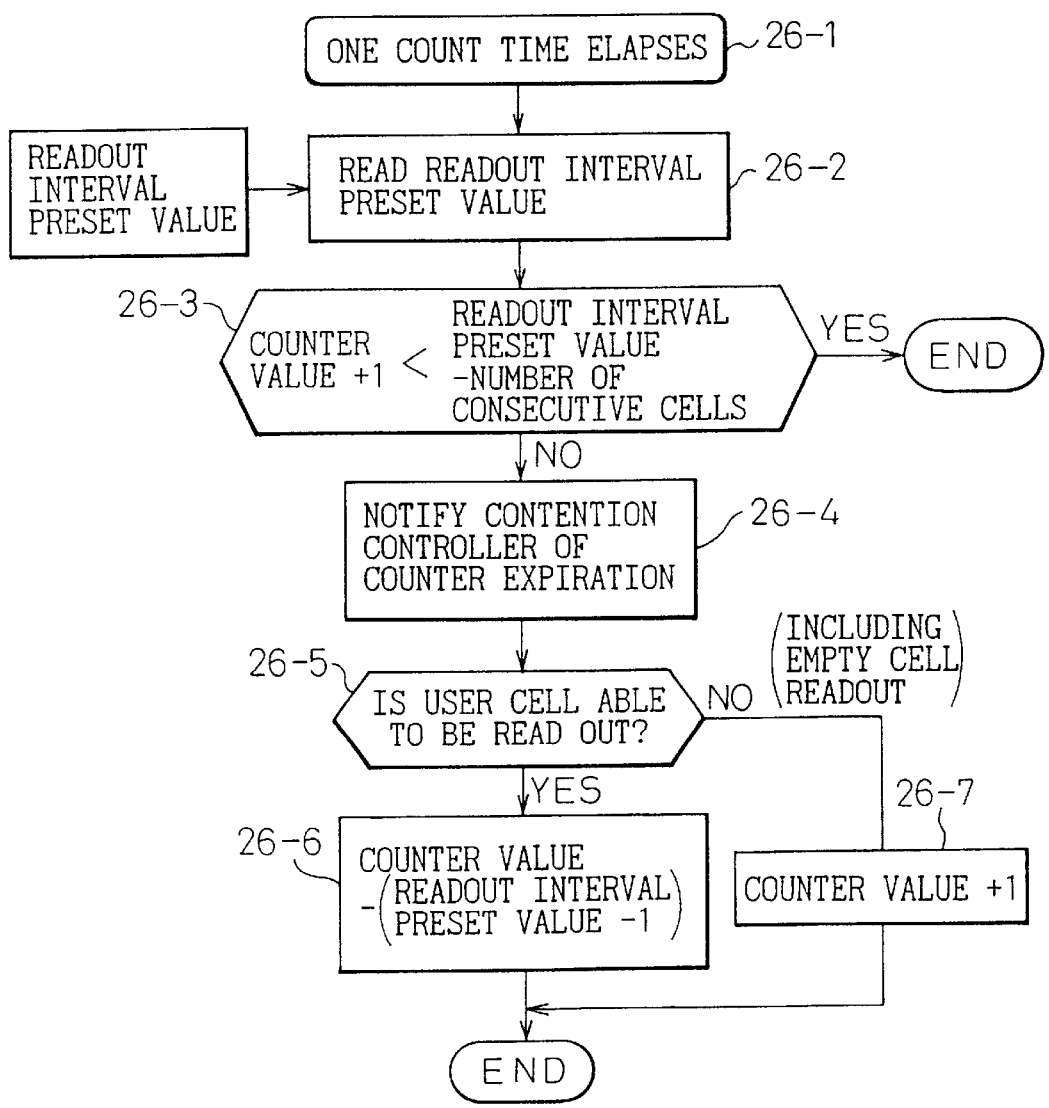
FIG. 26 is a diagram showing a readout selection instruction processing flow for the shaping block of the present invention.
Figure 27:
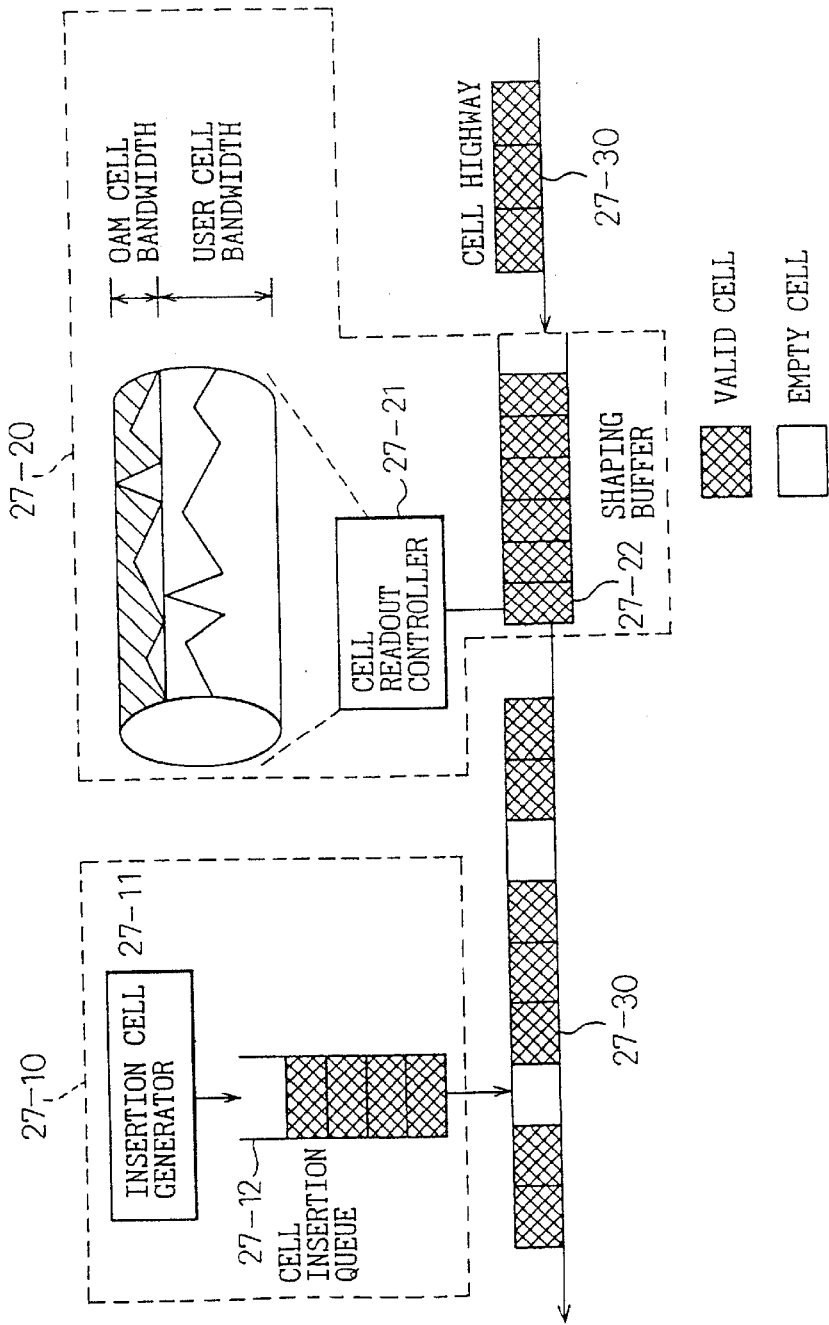
FIG. 27 is a diagram for explaining a prior art bandwidth control apparatus in ATM equipment.

FIG. 26 is a diagram illustrating a processing flow when the shaping rate is determined differently between the empty cell bandwidth and the user cell bandwidth according to the present invention. The flow until the contention controller 22-53 is notified of the counter expiration with the counter value of the scheduling counter 22-52 reaching the readout interval preset value (from processing flow 26-1 to processing flow 26-4) is the same as the corresponding processing flow shown in FIG. 25.

When notified of the counter expiration, the contention controller 22-53 determines whether a user cell is able to be read out (processing flow 26-5), and decreased by the read out internal preset value minus 1 only when a user cell is able to be read out (processing flow 26-6). If a user cell is not able to be read out, the counter value is incremented by 1 even when an empty cell is read out (processing flow 26-7), and the process is terminated.

To employ the shaping rate determined by combining the empty cell bandwidth with the user cell bandwidth or the shaping rates determined differently can be selected for each QoS class, based on whether a user declaration for required bandwidth is made in terms of the sum (aggregate) of the OAM cell bandwidth and the user cell bandwidth, or is made separately for OAM cells and user cells.

Empty cell insertion may be managed by assigning one QoS class to the empty cell information holding counter 22-6. As a means for defining the timing of empty cell insertion, a counter for defining readout timing, like the scheduling counter 22-52, may be provided for the empty cell information holding counter 22-6 which then inserts an empty cell when the counter expires. According to such configuration, the insertion rate of OAM cells can be limited within a certain value to prevent bursty insertion of OAM cells.

When managing empty cells by assigning one QoS class to the empty cell information holding counter 22-6, the means for defining the timing of empty cell insertion may be implemented so that the period when none of the scheduling counters 22-52 of other QoS classes have expired is determined as the timing for empty cell insertion.

Alternatively, priority may be set among a plurality of QoS classes whose cells are allowed to be read out during the period when none of the scheduling counters 22-52 of other QoS classes have expired, and the cells may be read out according to the priority.

Among services to which such a configuration is advantageously applied, the quality guaranteed service such as CBR or VBR can be applied to QoS classes in which the readout timing of a prescribed rate is provided by the expiration of the scheduling counter 22-52, while the best effort service such as empty cell insertion, ABR, or UBR can be applied to QoS classes in which cells are read out during the period when none of the scheduling counter 22-52 have expired, and further, priority may be provided among QoS classes providing such service as empty cell insertion, ABR, or UBR so that the cells can be read out according to the priority.

Instead of collectively handling the requested empty cells as one QoS class, a QoS class equivalent to that of user cells may be assigned and the cell readout timing for the assigned QoS class may be used as the timing to read out the requested empty cells. Further, for reading out the requested empty cells and user cells of the same QoS class, readout priority can be predetermined between them.

In such configuration, a QoS class providing the best effort service such as ABR or UBR is assigned as the QoS class of the requested empty cells, and among them, the readout priority of the requested empty cells is set higher than that of the user cells.

In that case, even if the requested empty cells are, for example, of the QoS class ABR, the cells are read out in preference to user cells of other QoS classes providing the best effort service, and since the QoS control can be shared between the requested empty cells and user cells while guaranteeing the quality of the requested empty cells, the amount of hardware can be reduced.

Further, in the configuration where a QoS class equivalent to that of user cells is assigned to the requested empty cells, cells may be read out alternately between the requested empty cells and user cells of the same QoS class in accordance with a predetermined readout ratio.

In such configuration, a QoS class providing the quality guaranteed service such as CBR or VBR is assigned as the QoS class of the requested empty cells, and the readout ratio of user cells to requested empty cells is set, for example, at 9:1. In such cases, not only can prescribed quality be guaranteed for the requested empty cells, but when neither user cells nor OAM cells are being inserted, the unused bandwidth can be allocated to the user cells of the QoS service providing the best effort service, and further, since the QoS control can be shared between the requested empty cells and user cells, the amount of hardware can be reduced.

Furthermore, in the configuration where a QoS class equivalent to that of user cells is assigned to the requested empty cells, the QoS class assigned to the requested empty cells may be made selectable so that, for example, the QoS class of each of CBR, VBR, ABR, and UBR can be assigned individually, or a combination of a plurality of QoS classes, such as the QoS classes of CBR and VBR or the QoS classes of ABR and UBR, can be assigned.

As described above, according to the present invention, only when a request for the insertion of a management cell such as an OAM cell occurs, is the necessary bandwidth allocated for the insertion, eliminating the need to secure the bandwidth for OAM cell or management cell insertion on a permanent basis; accordingly, during the period when the insertion of a management cell such as an OAM cell is not needed, the unused bandwidth can be allocated to user cells of the best effort service such as ABR or UBR, thus making effective use of network resources.

Further, for a management cell such as an OAM cell to be inserted, an empty cell is inserted based on the QoS class, line identifier, or connection identifier of the management cell to be inserted, and the cell to be inserted is written over the empty cell. In this way, a management cell such as an OAM cell can be inserted while guaranteeing prescribed quality of service for user cells.

Furthermore, according to the present invention, empty cells are requested and inserted by a plurality of fixed length packets so that variable length packets, such as IP packets, etc., can be mapped to ATM cells and transmitted.

What is claimed is:

1. A bandwidth control apparatus, comprising:

a buffer for accumulating received user cells;

a shaping means for reading out said user cells within a predetermined bandwidth from said buffer onto a cell highway, and generating an empty cell to be replaced with an insertion cell, in response to an empty cell request, so that said user cells are read out of said buffer, in such a manner as to allow the empty cell to be inserted between the user cells;

a cell insertion means for accumulating received insertion cells, and overwriting the insertion cell into the empty cell on the cell highway; and an empty cell requesting means for monitoring the cell insertion means, and sending the empty cell request to the shaping means based on the arrival of an insertion cell.

2. A bandwidth control apparatus, comprising a cell insertion block for inserting a management cell and a shaping block for shaping a user cell, wherein:

said cell insertion block includes means for sending an empty cell insertion request to said shaping block when a cell insertion requests occurs, and means for writing an insertion cell into an empty cell inserted on a cell highway, and said shaping block includes means for generating said empty cell when said empty cell insertion request is received from said cell insertion block, and for inserting said empty cell on said cell highway, and wherein:
only when a management cell insertion request occurs, is said management cell inserted by allocating a bandwidth thereto.

3. A bandwidth control apparatus according to claim 2 wherein, when sending said empty cell insertion request, said cell insertion block reports the quality of service class of said insertion cell, and said shaping block inserts said empty cell based on said reported quality of service class.

4. A bandwidth control apparatus according to claim 2 wherein, when sending said empty cell insertion request, said cell insertion block reports the line identifier of said insertion cell, and said shaping block inserts said empty cell based on said reported line identifier.

5. A bandwidth control apparatus according to claim 2 wherein, when sending said empty cell insertion request, said cell insertion block reports the connection identifier of said insertion cell, and said shaping block inserts said empty cell based on said reported connection identifier.

6. A bandwidth control apparatus according to claim 2 wherein, when sending said empty cell insertion request, said cell insertion block transmits information containing all of the quality of service class, line identifier, and connection identifier of said insertion cell, or a combination of two of them, and said shaping block inserts said empty cell based on said transmitted information of said insertion cell.

7. A bandwidth control apparatus according to claims 2 wherein, when sending a request for the insertion of a plurality of empty cells, said cell insertion block transmits the same empty cell insertion request information repeatedly a plurality of times.

8. A bandwidth control apparatus according to claims 2 wherein, when sending a request for the insertion of a plurality of empty cells, said cell insertion block reports the number of repetitions of the same cell insertion request information.

9. A bandwidth control apparatus, according to claims 2, wherein said cell insertion block includes a cell insertion queue, and sends said empty cell insertion request to said shaping block when writing said insertion cell to cell insertion queue.

10. A bandwidth control apparatus, according to claims 2, wherein said cell insertion block includes means for monitoring the queue length of said cell insertion queue, and sends said empty cell insertion request to said shaping block when said queue length has exceeded a predetermined threshold value.

11. A bandwidth control apparatus, according to claims 2, wherein said shaping block includes and empty cell counter or an empty cell request queue for holding the number of empty cell requests received from said cell insertion block, said empty cell counter being configured to manage the insertion of empty cells separately from a shaping buffer.

12. A bandwidth control apparatus, according to claims 2, wherein said shaping block includes means for writing said empty cell at the head or the tail of a user cell queue in a shaping buffer when said empty cell insertion request is received from said cell insertion block, said shaping block being configured to centrally manage insertion of empty cells and user cells by using said shaping buffer.

13. A bandwidth control apparatus according to claim 11, wherein said shaping block is provided with said empty cell counter for each line identifier.

14. A bandwidth control apparatus, according to claim 11, wherein said shaping block is provided with said empty cell counter for each connection identifier.

15. A bandwidth control apparatus, according to claim 11, wherein said shaping block is provided with said empty cell counter for each quality of service class.

16. A bandwidth control apparatus, according to claim 11, wherein said shaping block is provided with said empty cell counter for each of said line identifier, said connection identifier, and said quality of service class or for each combination of two of them.

17. A bandwidth control apparatus, according to claims 2, wherein said shaping block includes means for performing bandwidth control by assuming that a user cell has been read out of a shaping buffer when inserting said empty cell, said shaping block being configured to perform shaping by including an empty cell bandwidth within a user cell bandwidth.

18. A bandwidth control apparatus, according to claims 2, wherein said shaping block includes means for performing control so as not to read out a user cell from a shaping buffer when inserting said empty cell but to read out said user cell after the insertion of said empty cells, said shaping block being configured to perform shaping for an empty cell bandwidth and a user cell bandwidth separately from each other.

19. A bandwidth control apparatus, according to claims 2, wherein said shaping block assigns one quality of service class to requested empty cells, and inserts said empty cells on said cell highway at a predetermined rate.

20. A bandwidth control apparatus, according to claims 11, wherein said shaping block assigns one quality of service class to requested empty cells, and reads out said empty cells onto said cell highway when user cells of other higher priority quality of service classes are not being read out.

21. A bandwidth control apparatus, according to claim 20, wherein, between said empty cells and user cells assigned a quality of service class that allows said user cells to be read out when cells of other higher priority.

22. A bandwidth control apparatus, according to claims 2, wherein said shaping block assigns as the quality of service class of requested empty cells the same quality of service class as one of the quality of service classes assigned to user cells, and reads out said empty cells onto said cell highway.

23. A bandwidth control apparatus, according to claim 22, wherein said shaping block reads out user cells or empty cells in accordance with priority predetermined between said user cells and said empty cells.

24. A bandwidth control apparatus, according to claim 22, wherein said shaping block reads out empty cells and user cells alternately at a predetermined ratio onto said cell highway.

25. A bandwidth control apparatus, according to claim 22, wherein said shaping block assigns said requested empty cells one or more quality of service classes selected from among a plurality of quality of service classes.

26. A bandwidth control apparatus, comprising:
a buffer for accumulating received user packets;
a shaping means for reading out said user packets within a predetermined bandwidth from said buffer onto a packet highway, and generating an empty packet to be replaced with an insertion packet, in response to an empty packet request, so that said user packets are read out of said buffer in such a manner as to allow the empty packet to be inserted between the user packets;
a packet insertion means for accumulating received insertion packets, and overwriting the insertion packet into the empty packet on the packet highway; and
an empty packet requesting means for monitoring the packet insertion means, and sending the empty packet request to the shaping means based on the arrival of an insertion packet.

27. A bandwidth control apparatus, comprising a packet insertion block for inserting a management packet and a shaping block for shaping a user packet, wherein:

said packet insertion block includes means for sending an empty packet insertion request to said shaping block when a packet insertion request occurs, and means for writing an insertion packet into an empty packet inserted on a packet highway, and said shaping block includes means for generating said empty packet when said empty packet insertion request is received from said packet insertion block, and for inserting said empty packet on said packet highway, and wherein:

only when a management packet insertion request occurs, is said management packet inserted by allocating a bandwidth thereto.

* * * * *